(12) United States Patent
Batchelor et al.

(10) Patent No.: US 6,502,157 B1
(45) Date of Patent: Dec. 31, 2002

(54) METHOD AND SYSTEM FOR PERFETCHING DATA IN A BRIDGE SYSTEM

(75) Inventors: Gary William Batchelor; Carl Evan Jones; Forrest Lee Wade, all of Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/275,857

(22) Filed: Mar. 24, 1999

(51) Int. Cl.[7] .............................................. G06F 13/00
(52) U.S. Cl. ..................... 710/310; 710/52; 710/305; 710/306
(58) Field of Search ........................ 710/52, 100, 107, 710/126, 129, 128, 130, 305, 306, 307, 310, 311; 711/137, 150, 169, 214, 219

(56) References Cited

U.S. PATENT DOCUMENTS

| | | |
|---|---|---|
| 4,490,788 A | 12/1984 | Rasmussen |
| 4,947,366 A | 8/1990 | Johnson |
| 5,404,463 A | 4/1995 | McGarvey |
| 5,448,704 A | 9/1995 | Spaniol et al. |
| 5,522,050 A | 5/1996 | Amini et al. |
| 5,555,383 A | 9/1996 | Elazar et al. |
| 5,574,944 A | 11/1996 | Stager |
| 5,581,714 A | 12/1996 | Amini et al. |
| 5,594,878 A | 1/1997 | Shibata et al. |
| 5,603,052 A | 2/1997 | Chejlava, Jr. et al. |
| 5,608,884 A | 3/1997 | Potter |
| 5,632,021 A | 5/1997 | Jennings et al. |
| 5,634,033 A | 5/1997 | Stewart et al. |
| 5,644,729 A | 7/1997 | Amini et al. |
| 5,649,161 A | 7/1997 | Andrade et al. |
| 5,664,117 A | 9/1997 | Shah et al. |
| 5,664,124 A | 9/1997 | Katz et al. |
| 5,666,551 A | 9/1997 | Fenwick et al. |
| 5,673,399 A | 9/1997 | Guthrie et al. |

(List continued on next page.)

OTHER PUBLICATIONS

PCI to PCI Bridge Architecture Specification; PCI Local Bus, Revision 1.0, Apr. 5, 1994.
PCI Local Bus Specification; PCI Local Bus, Revision 2.1, Jun. 1, 1995 (Chapter 3.0, Appendix E).
PCI–to–PCI Bridge Architecture Specification, PCI Local Bus, Revision 1.1, Dec. 18, 1998 (Chapter 3,4,5).
PCI Local Bus Specification; PCI Local Bus, Revision 2.2, Dec. 18, 1998, (Chapter 1,2,3).
U.S. patent application Ser. No. 09/275,603 (TU9–98–073 18.43).
U.S. patent application Ser. No. 09/275,610 (TU9–98–074 18.44).
U.S. patent application Ser. No. 09/275,470 (TU9–98–075 18.45).

*Primary Examiner*—Xuan M. Thai
(74) *Attorney, Agent, or Firm*—David W. Victor; Konrad Raynes Victor & Mann LLP

(57) ABSTRACT

Disclosed is a bridge system and method for prefetching data to return to a read request from an agent. The bridge system includes at least one memory device including a counter indicating a number of prefetch operations to perform to prefetch all the requested data, a first buffer capable of storing prefetch requests, and a second buffer capable of storing read data. Control logic implemented in the bridge system includes means for queuing at least one prefetch operation in the first buffer while the counter is greater than zero. The control logic then executes a queued prefetch operation, subsequently receives the prefetched data, and stores the prefetched data in the second buffer. The stored prefetched data is returned to the requesting agent.

29 Claims, 11 Drawing Sheets

U.S. PATENT DOCUMENTS

| | | |
|---|---|---|
| 5,699,529 A | 12/1997 | Powell et al. |
| 5,706,469 A | 1/1998 | Kobayashi |
| 5,712,986 A | 1/1998 | Vo |
| 5,721,839 A | 2/1998 | Callison et al. |
| 5,721,841 A | 2/1998 | Szczepanek |
| 5,724,528 A | 3/1998 | Kulik et al. |
| 5,734,841 A | 3/1998 | Shin et al. |
| 5,734,847 A | 3/1998 | Garbus et al. |
| 5,737,744 A | 4/1998 | Callison et al. |
| 5,740,376 A | 4/1998 | Carson et al. |
| 5,740,385 A | 4/1998 | Hayek et al. |
| 5,748,920 A | 5/1998 | Mills et al. |
| 5,748,921 A | 5/1998 | Lambrecht et al. |
| 5,758,166 A | 5/1998 | Ajanovic |
| 5,761,450 A | 6/1998 | Shah |
| 5,761,462 A | 6/1998 | Neal et al. |
| 5,761,464 A * | 6/1998 | Hopkins ..................... 710/301 |
| 5,761,725 A | 6/1998 | Zeller et al. |
| 5,764,924 A | 6/1998 | Hong |
| 5,768,548 A | 6/1998 | Young et al. |
| 5,809,516 A * | 9/1998 | Ukai et al. ................... 711/114 |
| 5,862,403 A * | 1/1999 | Kania et al. ................. 395/826 |
| 5,930,464 A * | 7/1999 | Nakayama et al. ......... 395/114 |
| 5,978,866 A * | 11/1999 | Nain ........................... 710/22 |
| 6,094,696 A * | 7/2000 | Choe et al. .................... 710/57 |
| 6,119,203 A * | 9/2000 | Snyder et al. .............. 711/137 |
| 6,157,988 * | 12/2000 | Dowling ..................... 711/140 |
| 6,185,641 * | 2/2001 | Dunnihoo ..................... 710/56 |
| 6,236,663 * | 5/2001 | Kawakami .................. 370/470 |

\* cited by examiner

METHOD AND SYSTEM FOR PERFETCHING DATA IN A BRIDGE SYSTEM

CROSS-REFERENCE TO RELATED APPLICATIONS

This application is related to the following co-pending and commonly-assigned patent applications, which applications were filed on the same date herewith, and which applications are incorporated herein by reference in their entirety:

"Method and System for Multiple Read/Write Transactions Across a Bridge System," to Gary W. Batchelor, Russell L. Ellison, Carl E. Jones, Robert E. Medlin, Belayneh Tafesse, Forrest Lee Wade, and Juan A. Yanes, Ser. No. 09/275,470;

"Read Gather on Delayed Read Requests and Write Gather on Posted Write Operations for PCI Agents," to Gary W. Batchelor, Carl E. Jones, Dell P. Leabo, Robert E. Medlin, and Forrest Lee Wade, Ser. No. 09/275,603; and "Delayed Read Continuation on Prefetched Data Non-Continuous Address," to Gary W. Batchelor, Brent C. Beardsley, Matthew J. Kalos, and Forrest Lee Wade, Ser. No. 09/275,610.

BACKGROUND OF THE INVENTION

1. Field of the Invention

The present invention relates to a method and system for prefetching data within a bridge system.

2. Description of the Related Art

The Peripheral Component Interconnect (PCI) bus is a high-performance expansion bus architecture that was designed to replace the traditional ISA (Industry Standard Architecture) bus. A processor bus master communicates with the PCI local bus and devices connected thereto via a PCI Bridge. This bridge provides a low latency path through which the processor may directly access PCI devices mapped anywhere in the memory or I/O address space. The bridge may optionally include such functions as data buffering/posting and PCI central functions such as arbitration. The architecture and operation of the PCI local bus is described in "PCI Local Bus Specification," Revisions 2.0 (April, 1993) and Revision 2.1s, published by the PCI Special Interest Group, 5200 Elam Young Parkway, Hillsboro, Ore., which publication is incorporated herein by reference in its entirety.

A PCI to PCI bridge provides a connection path between two independent PCI local busses. The primary function of the bridge is to allow transactions between a master on one PCI bus and a target device on another PCI bus. The PCI Special Interest Group has published a specification on the architecture of a PCI to PCI bridge in "PCI to PCI Bridge Architecture Specification," Revision 1.0 (Apr. 10, 1994), which publication is incorporated herein by reference in its entirety. This specification defines the following terms and definitions:

initiating bus—the master of a transaction that crosses a PCI to PCI bridge is said to reside on the initiating bus.

target bus—the target of a transaction that crosses a PCI to PCI bridge is said to reside on the target bus.

primary interface—the PCI interface of the PCI to PCI bridge that is connected to the PCI bus closest to the CPU is referred to as the primary PCI interface.

secondary interface—the PCI interface of the PCI to PCI bridge that is connected to the PCI bus farthest from the CPU is referred to as the secondary PCI interface.

downstream—transactions that are forwarded from the primary interface to the secondary interface of a PCI to PCI bridge are said to be flowing downstream.

upstream—transactions forwarded from the secondary interface to the primary interface of a PCI to PCI bridge are said to be flowing upstream.

The basic transfer mechanism on a PCI bus is a burst. A burst is comprised of an address phase and one or more data phases. When a master or agent initiates a transaction, each potential bridge "snoops" or reads the address of the requested transaction to determine if the address is within the range of addresses handled by the bridge. If the bridge determines that the requested transaction is within the bridge's address range, then the bridge asserts a DEVSEL# on the bus to claim access to the transaction.

There are two types of write transactions, posted and non-posted. Posting means that the write transaction is captured by an intermediate agent, such as a PCI bridge, so that the transaction completes at the originating agent before it completes at the intended destination, e.g., the data is written to the target device. This allows the originating agent to proceed with the next transaction while the requested transaction is working its way to the ultimate destination. Thus, the master bus initiating a write operation may proceed to another transaction before the written data reaches the target recipient. Non-posted transactions reach their ultimate destination before completing at the originating device. With non-posted transactions, the master cannot proceed with other work until the transaction has completed at the ultimate destination.

All transactions that must complete on the destination bus, i.e., secondary bus, before completing on the primary bus may be completed as delayed transactions. With a delayed transaction, the master generates a transaction on the primary bus, which the bridge decodes. The bridge then ascertains the information needed to complete the request and terminates the request with a retry command back to the master. After receiving the retry, the master reissues the request until it completes. The bridge then completes the delayed read or write request at the target device, receives a delayed completion status from the target device, and returns the delayed completion status to the master that the request was completed. A PCI to PCI bridge may handle multiple delayed transactions.

With a delayed read request, the read request from the master is posted into a delayed transaction queue in the PCI to PCI bridge. The bridge uses the request to perform a read transaction on the target PCI bus and places the read data in its read data queue. When the master retries the operation, the PCI to PCI bridge satisfies the request for read data with data from its read data queue.

With a delayed write request, the PCI to PCI bridge captures both the address and the first word of data from the bus and terminates the request with a retry. The bridge then uses this information to write the word to the target on the target bus. After the write to the target has been completed when the master retries the write, the bridge will signal that it accepts the data with TRDY# thereby notifying the master that the write has completed.

The PCI specification provides that a certain ordering of operations must be preserved on bridges that handle multiple operations to prevent deadlock. These rules are on a per agent basis. Thus, for a particular agent communicating on a bus and across a PCI bridge, the agent's reads should not pass their writes and a later posted write should not pass an earlier write. However, with current bridge architecture, only a single agent can communicate through the PCI bridge architecture at a time. If the PCI bridge is handling a delayed request operation and a request from another agent is attempted, then the PCI bridge will terminate the subsequent transaction from another agent with a retry command. Thus, a write operation from one agent that is delayed may delay read and write operations from other agents that communicate on the same bus and PCI bridge. Such delays are referred to as latency problems as one agent can delay the processing of transactions from other agents until the agent currently controlling the bus completes its operations. Further, with a delayed read request, a delayed read request from one agent must be completed before other agents can assert their delayed read requests.

Current systems attempt to achieve a balance between the desire for low latency between agents and high throughput for any given agent. High throughput is achieved by allowing longer burst transfers, i.e., the time an agent or master is on the bus. However, increasing burst transfers to improve throughput also increases latency because other agents must wait for the agent currently using the longer bursting to complete. Current systems employ a latency timer which is a clock that limits the amount of time any one agent can function as a master and control access to the bus. After the latency time expires, the master may be required to terminate its operation on the bus to allow another master agent to assert its transaction on the bus. In other words, the latency timer represents a minimum number of clocks guaranteed to the master. Although such a latency timer places an upper bound on latency, the timer may prematurely terminate a master's tenure on the bus before the transaction terminates, thereby providing an upper bound on throughput.

One current method for reducing latency is the prefetch operation. Prefetch refers to the situation where a PCI bridge reads data from a target device in anticipation that the master agent will need the data. Prefetching reduces the latency of a burst read transaction because the bridge returns the data before the master actually requests the data, thereby reducing the time the master agent controls access to the bus to complete its requested operation. A prefetchable read transaction may be comprised of multiple prefetchable transactions. A prefetchable transaction will occur if the read request is a memory read within the prefetchable space, a memory read line, and memory read multiple. The amount of data prefetched depends on the type of transaction and the amount of free buffer space to buffer prefetched data.

Disconnect refers to a termination requested with or after data was transferred on the initial data phase when the target is unable to respond within the target subsequent latency requirement and, therefore, is temporarily unable to continue bursting. A disconnect may occur because the burst crosses a resource boundary or a resource conflict occurs. Disconnect differs from retry in that retry is always on the initial data phase, and no data transfers. Disconnect may also occur on the initial data phase because the target is not capable of doing a burst. In current PCI art, if a read is disconnected and another agent issues an intervening read request, then any prefetched data maintained in the PCI buffer for the disconnected agent is discarded. Thus, when the read disconnected agent retries the read request, the PCI bridge will have to again prefetch the data because any prefetched data that was not previously returned to the agent prior to the disconnect would have been discarded as a result of the intervening read request from another agent.

There is thus a need in the art for an improved bridge architecture to handle read/write transactions across a bridge from multiple agents.

SUMMARY OF THE PREFERRED EMBODIMENTS

Provided is an improved bridge system and method for prefetching data to return to a read request from an agent. The bridge system includes at least one memory device including a counter indicating a number of prefetch operations to perform to prefetch all the requested data, a first buffer capable of storing prefetch requests, and a second buffer capable of storing read data. Control logic implemented in the bridge system includes means for queuing at least one prefetch operation in the first buffer while the counter is greater than zero. The control logic then executes a queued prefetch operation, subsequently receives the prefetched data, and stores the prefetched data in the second buffer. The stored prefetched data is returned to the requesting agent.

In further embodiments, the requested data may be maintained in multiple tracks. In such case, the memory device includes a counter for each of the plurality of tracks including the requested data. Each counter indicates a number of prefetch operations to perform to prefetch all the requested data in the track corresponding to the counter. The control logic prefetches the data for each counter and stores the prefetched data in the second buffer.

In yet further embodiments, the bridge system prefetches data for multiple read requests from multiple agents. A counter is provided for each requesting agent and prefetch operations for the read requests from the multiple requesting agents are queued in separate queues. In this way, prefetch operations may be simultaneously queued for different requesting agents.

In still further embodiments, the bridge system prefetches data for multiple read requests from a single agent. A counter is provided for each of the multiple read requests from the single agent.

Preferred embodiments allow a bridge to prefetch all the data to service a read request in advance of returning the data by providing a counter indicating the number of prefetch operations that need to be performed. Latency times may be reduced because the bridge will return prefetched data from a buffer. In this way, requesting agents do not have to wait for the bridge to retrieve the data from the target device as requested data is returned from the buffer.

Moreover, with preferred embodiments, counters and read request queues may be provided for each requesting agent. With these structures, the bridge system may concurrently queue prefetch operations from different requesting agents to prefetch all the data for the read requests from different agents. The bridge may execute the queued prefetch operations for different agents using time division multiplexing to prefetch data across all requesting agents. This insures that the bridge system will have prefetched data to service agent read requests being time division multiplexed on the bus, thereby reducing latency across multiple requesting agents.

BRIEF DESCRIPTION OF THE FIGURES

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Architecture

Figure 1:
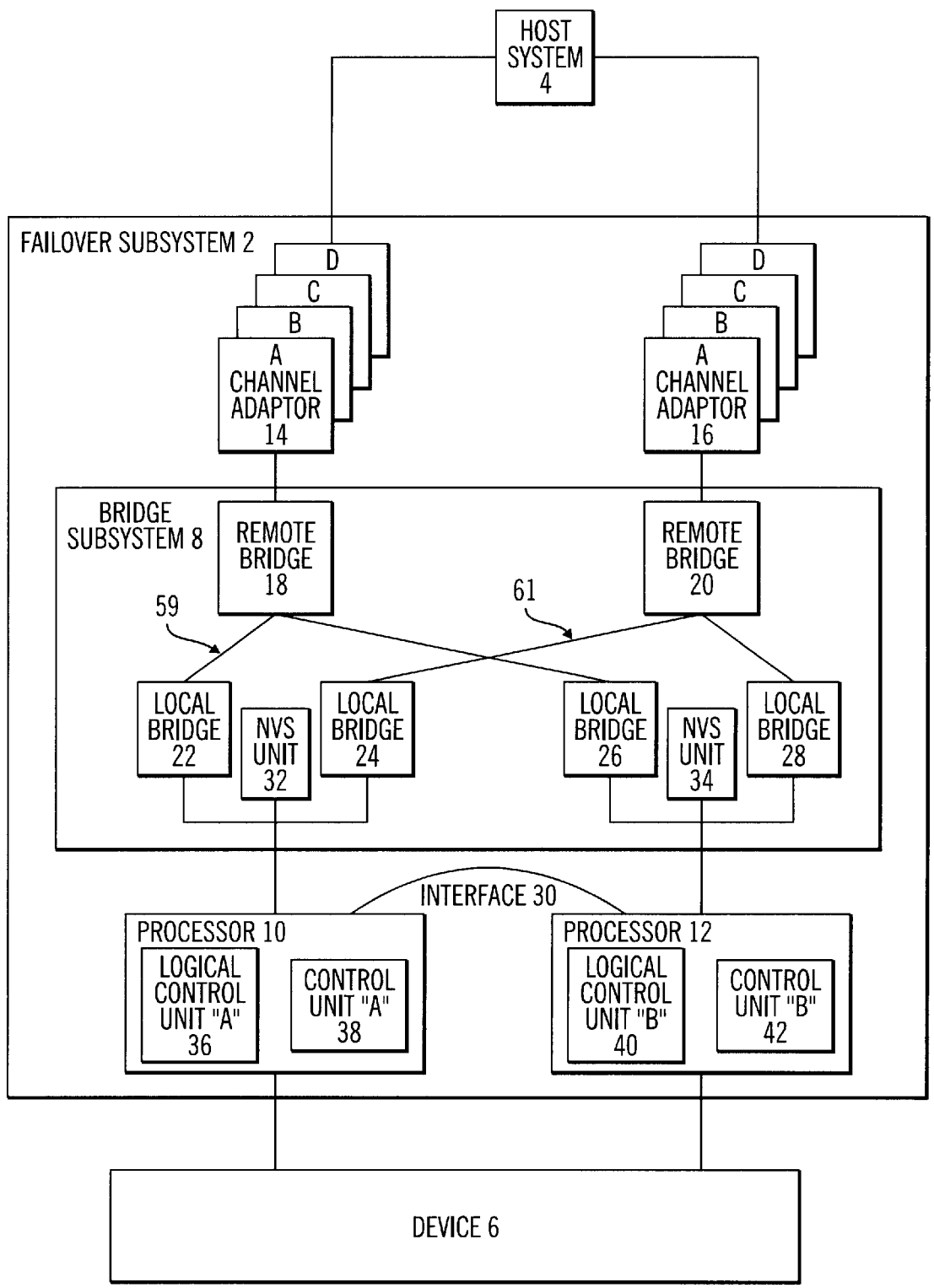
FIG. 1 illustrates a preferred embodiment of the hardware configuration of the bridge and failover subsystems in accordance with the present invention.

FIG. 1 illustrates a hardware environment in which preferred embodiments are implemented. A failover subsystem 2 provides data communication paths between a host system 4 and a device 6. In preferred embodiments, the failover subsystem 2 includes a bridge subsystem 8 that allows either processor 10, 12 to communicate with and configure channel adaptors 14A, B, C, D and 16A, B, C, D. The bridge subsystem 8 further allows either processor 10, 12 to operate as a master of the bridge subsystem 8. In alternative embodiments, the bridge subsystem 8 could be used to allow processors 10, 12 to communicate with devices other than channel adaptors 14, 16 including any device that typically communicates over a bus to a processor. In the embodiment of FIG. 1, each set of channel adaptors 14, 16 is comprised of four channel adaptor cards A, B, C, D that are each connected via a slot to a remote bridge 18, 20. Each channel adaptor card A, B, C, D provides a connection to one or more host systems. In further embodiments the actual number of channel adaptors used may be more or less than the number described in the preferred embodiment.

The device 6 may be a direct access storage device (DASD) or other subsystem. Related co-pending and commonly assigned U.S. Patent Applications: "Failure System for a Multiprocessor Storage Controller," by Brent C. Beardsley, Matthew J. Kalos, Ronald R. Knowlden, Ser. No. 09/026,622, filed on Feb. 20, 1998; and "Failure and Failback System for a Direct Access Storage Device," by Brent C. Beardsley and Michael T. Benhase, Ser. No. 08/988,887, filed on Dec. 11, 1997, both of which applications are incorporated herein by reference in their entirety, describe the use of a failover subsystem providing communication paths between a host system and a string of DASDs.

As illustrated in FIG. 1, the bridge subsystem 8 includes two remote bridges 18, 20. Remote bridge 18 is connected to local bridges 22, 26 and remote bridge 20 is connected to local bridges 24, 28. The failover subsystem 2 is comprised of two sides. One side includes channel adaptors 14, remote bridge 18, local bridges 22, 24, and processor 10. The other side similarly includes channel adaptors 16, remote bridge 20, local bridges 26, 28, and processor 12. These sides allow each set of channel adaptors 14, 16 to communicate with each processor 10, 12. Channel adaptors 14A, B, C, D communicate with processor 10 via remote bridge 18 and local bridge 22 and with processor 12 via remote bridge 18 and local bridge 26. Channel adaptors 16A, B, C, D communicate with processor 10 via remote bridge 20 and local bridge 24 and with processor 12 via remote bridge 20 and local bridge 28. The host system 4 shown in FIG. 1 is a dual host system known in the art. For instance, if the host system 4 is connected to channel adaptor 14A and channel adaptor 16A, then the host system 4 may select from either of the two channel adaptors 14A, 16A to communicate with the processors 10, 12 and device 6 below. Further, a local bridge 22 or 26, the remote bridge 18, and the bus 59 or 61 providing communication therebetween (shown in both FIGS. 1 and 2) may comprise a PCI to PCI bridge.

The processors 10 and 12 may communicate via an interface 30, which may be an $I^2C$ interface, Ethernet or any other suitable interface known in the art or another bridge subsystem 8. The processors 10, 12 can detect a failure of the other processor via the interface 30.

A non-volatile storage (NVS) unit 32, 34 is linked to each path between each pair of local bridges 22, 24 and 26, 28. In alternative embodiments, the architecture may not include an NVS unit 32, 34. In preferred embodiments, local busses could be used to interconnect the bridge components 18, 20, 22, 24, 26, 28 within the bridge subsystem 8 to any downstream or upstream device, thereby providing primary and secondary interfaces, wherein any bridge component or device linked thereto may be the initiating or targeting bus. For instance, a local bus could interconnect remote bridge 18 with local bridges 22, 26, a local bus could interconnect local bridges 22, 24, NVS unit 32, and processor 10, and a local bus could interconnect channel adaptors 14 with remote bridge 18. Similarly, a local bus could interconnect remote bridge 20 with local bridges 24, 28, a local bus could interconnect local bridges 26, 28, NVS unit 34, and processor 12, and a local bus could interconnect channel adaptors 16 with remote bridge 20. In yet further embodiments, any number of combinations of local busses could provide interconnection between the components of the bridge subsystem 8, processors 10, 12, and channel adaptors 14, 16.

Figure 2:
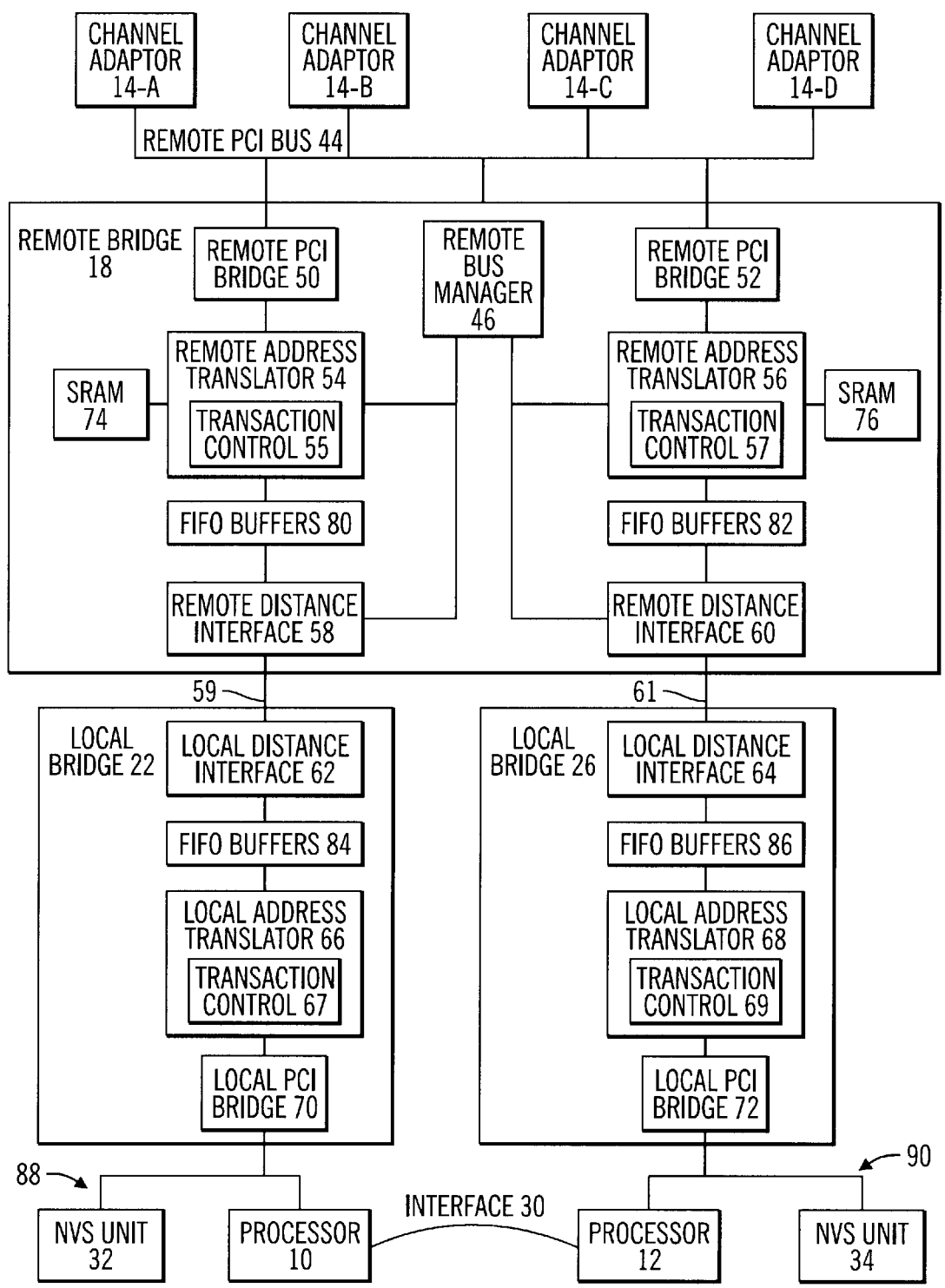
FIG. 2 illustrates a preferred embodiment of the hardware configuration of a portion of the bridge subsystem illustrated in FIG. 1.

FIG. 2 provides further detail of one-half of the bridge subsystem 8, including remote bridge 18 and local bridges 22, 26, that allows the processors 10, 12 to communicate with channel adaptors 14. The same configuration would apply to the other half of the bridge 8 and failover 2 subsystems, including channel adaptors 16, remote bridge 20, local bridges 24, 28, and processors 10, 12.

Remote bridge 18 includes a remote PCI bus 44. A remote bus manager 46 manages data and signals presented on the remote PCI bus 44. The remote bus manager 46 includes bus central resource functions, which comprise circuitry that manages bus arbitration, bus parking, and other bus management functions. In the preferred embodiments, the central resource functions are implemented in standalone bus manager 46 circuitry. Alternatively, the central resource functions may be implemented in the PCI bridge 50 or 52 components upstream and PCI bridge 70 or 72 downstream. The remote bus manager 46 performs bus master functions, such as arbiter functions, for the bus 44. The remote bus manager 46 has information of the address ranges claimed by the remote PCI bridges 50 and 52 and uses this information to determine which remote PCI bridge 50 or 52 is the target of a PCI operation. The information on the address ranges dedicated to the remote PCI bridges 50 and 52 may be hardwired into the remote bus manager 46 circuitry or, alternatively, written to registers in the remote PCI bridges 50 or 52 that the remote bus manager 46 may access. The remote bus manager 46 is preferably implemented in dedicated control circuitry. Remote bridge 18 includes two sides, each side having a remote PCI bridge 50, 52, a remote address translator 54, 56, transaction control 55, 57, a remote distance interface 58, 60, and a static random access memory (SRAM) 74, 76 or any other suitable memory device known in the art. Remote PCI bridge 50, remote address translator 54, remote transaction control 55, and remote distance interface 58 provide communication between channel adaptors 14 and local bridge 22. Remote PCI bridge 52, remote address translator 56, remote transaction control 57, and remote distance interface 60 provide communication between channel adaptors 14 and local bridge 26. The channel adaptors 14A, B, C, D communicate with either remote PCI bridge 50, 52 via the remote PCI bus 44. Remote PCI bridges 50, 52 may be comprised of PCI bridge chips known in the art or any other suitable type of bridge chip which is capable of performing the functions discussed herein. The remote 58, 60 and local 62, 64 distance interfaces include controls and buffers known in the bridge art to control transactions between the remote bridge 18 and the local bridges 22, 26, and provide for long distance communication therebetween.

Each local bridge 22, 26 includes, respectively, a local distance interface 62, 64, a local address translator 66, 68, local transaction control 67, 69, and a local PCI bridge 70, 72. The remote 54, 56 and local 66, 68 address translators include circuitry known in the art to map a received address to another address space. Remote address translators 54, 56 perform address translation operations by mapping an address provided by channel adaptors 14 to the address space of the local PCI bridges 70, 72, respectively. Local address translators 66, 68 would map an address from the local PCI bridges 70, 72 to the address space of the remote PCI bridges 50, 52, respectively. The remote 54, 56 and local 66, 68. address translators also include data buffer control circuitry known in the art to transmit data and address information. For instance, after local address translator 66, 68 translates an address received from the local PCI bridge 70, 72 to the remote PCI bridge 50, 52 address space, this translated address is transmitted to the remote address translator 54, 56 via the local 62, 64 and remote 58, 60 distance interfaces. In such case, the remote address translator 54, 56 may buffer and transmit this received address to the remote PCI bridge 50, 52 without performing further translation. Likewise, after remote address translator 54, 56 translates an address received from the remote PCI bridge 50, 52 to the address space of the local PCI bridge 70, 72, respectively, this translated address is transmitted to the local address translator 66, 68 via the remote 58, 60 and local 62, 64 distance interfaces. In such case, the local address translator 66, 68 may buffer and transmit this received address to the local PCI bridge 70, 72 without performing further translation. The remote address translators 54 and 56 may maintain information in internal registers that is used for address translation. Alternatively, the remote address translators 54, 56 may access an address translation map maintained in SRAM 74, 76, respectively.

The components and configuration of remote bridge 20 and local bridges 24, 28 that provide communication paths between channel adaptors 16 and processors 10, 12 are identical to that of the remote bridge 18 and local bridges 22, 26 discussed above. FIG. 2 further illustrates local busses 88, 90 that can interconnect local PCI bridges 70, 72, NVS units 32, 34, and processors 10, 12, respectively.

Further details of the preferred bridge subsystem 8 embodiment which allows either processor 10, 12 to function as the master of the bridge subsystem 8 is described in the co-pending and commonly assigned IBM patent application, entitled "Bridge Failover System," Ser. No. 09/026,620, by Brent C. Beardsley, Carl E. Jones, and Forrest L. Wade, filed on Feb. 20, 1998, which application is incorporated herein by reference in its entirety. Further details of PCI technology and bridge architecture, which may be utilized in the remote and local PCI bridges 50, 52, 70, and 72, are described in "PCI Local Bus Specification, Revision 2.2" published by the PCI Special Interest Group (December, 1998) and "PCI-to-PCI Bridge Architecture Specification, Revision 1.1," published by the PCI Special Interest Group (December, 1998), which specifications are incorporated herein by reference in their entirety.

FIFO Buffers

Preferred embodiments provide parallel FIFO buffers to allow parallel operations from different agents across a PCI bridge. The use of FIFO buffers to queue read/write transactions in a bridge system are known in the art. FIG. 2 shows sets of FIFO buffer 80, 82, 84, and 86. Each FIFO buffer section 80, 82, 84, and 86 includes multiple FIFO buffers to queue requests from the channel adaptors 14A, B, C, D and the processors 10 and 12. Thus, a set of FIFO buffers 80, 82, 84, and 86 are located at the end of each distance interface 58, 60, 62, 64. The FIFO buffers 80, 82, 84, 86 may each be implemented within a dual port memory device where one port feeds into the transaction control 55, 57, 67, and 69, respectively, and the other port feeds into the distance interface 58, 60, 62, and 64, respectively. Each separate queue in the FIFO buffers 80, 82, 84, and 86 may be comprised of a specific address range within the dual port memory device in which the FIFO buffers 80, 82, 84, and 86 are implemented.

The address translators 54, 56, 66, and 68 include transaction control circuitry 55, 57, 67, and 69 that includes logic to select a queue in the FIFO buffers 80, 82, 84, and 86 to place a transaction and manage the flow of transactions. The transaction control 55, 57, 67, and 69 may also be implemented in circuitry external to the address translator circuitry 54, 56, 66, and 68.

With respect to FIG. 2, the remote and local bridges 18, 22 may concurrently process a thread or data stream for each PCI slot or adaptor 14A, B, C, D. Thus, a single process may be executed within the remote and local bridge architecture for an operation initiated at one of the channel adaptors 14A, B, C, D. This operation may be a read or write operation. For instance, the channel adaptors 14A, B, C, D may concurrently issue and have the remote bridge 18 concurrently process transactions toward both processors 10 and 12.

Figure 3:
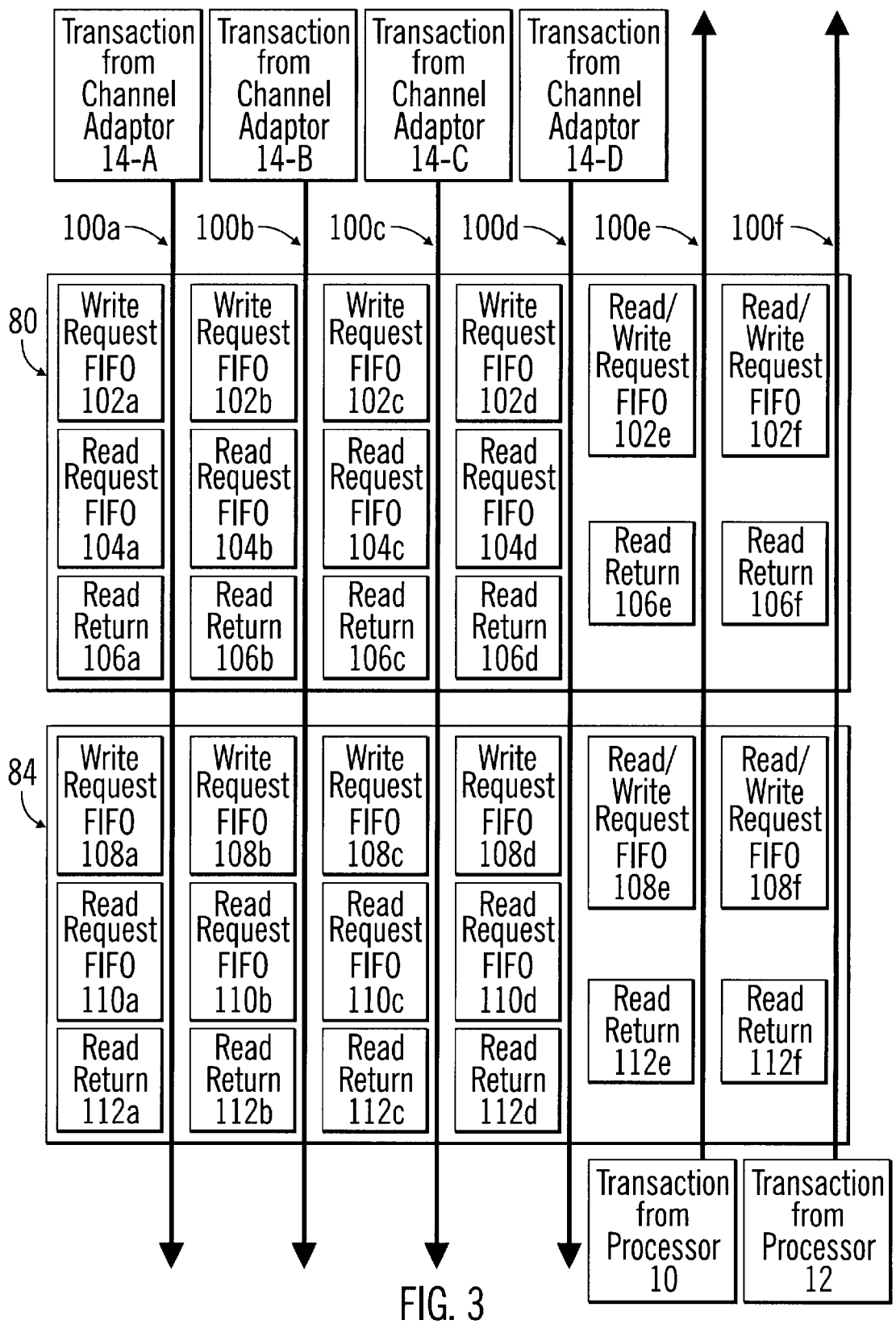
FIG. 3 illustrates FIFO buffers used to queue and process in parallel transactions and return data for the transactions originating from different agents in accordance with preferred embodiments of the present invention.

FIG. 3 shows sixteen FIFO buffers included in FIFO buffer sections 80 and 84. The same structure and process described with respect to FIFO buffers 80 and 84 would apply to FIFO buffer sections 82 and 86, and any other FIFO buffer section within the bridge subsystem 8. In preferred embodiments, in each FIFO buffer section 80, 82, 84, and 86, there is one set of FIFO buffers for each PCI slot or channel adaptor 14A, B, C, D, one for transactions from processor 10 to processor 12, and another for transactions from processor 12 to processor 10. FIG. 3 shows read/write request transactions 100*a, b, c, d, e, f* originating from the channel adaptors 14A, B, C, D, processor 10, and processor 12, respectively. FIG. 3 illustrates how transactions from the different agents flow through the FIFO buffers 80 and 84 in the remote 18 and local 22 bridges. With the FIFO structure of the preferred embodiments, each of the processes 100a, b, c, d, e, f may be executed independently or concurrently within the bridge subsystem 8.

In each FIFO buffer section 80 and 84, sets of FIFO buffers are provided for each originating agent, e.g., the channel adaptors 14A, B, C, D and processors 10 and 12. Three FIFO buffers are associated with each channel adaptor 14A, B, C, D. For remote PCI bridge 50, the write request FIFO buffers 102a, b, c, d maintain the write data and the address of where to write data from channel adaptors 14A, B, C, D. The read request FIFO buffers 104a, b, c, d maintain the address of the read transaction from channel adaptors 14A, B, C, D, including the start location of where to read and the byte count or length of the data to read. The read return FIFO buffers 106a, b, c, d buffer the data read as part of the read request from the channel adaptors 14A, B, C, D. Likewise, FIFO buffer section 84 includes, for transactions 100a, b, c, d, e, f, write request FIFO buffers 108a, b, c, d, read request FIFO buffers 110a, b, c, d, and read return buffers 112a, b, c, d, e, f, as well as read/write request FIFO buffers 108e, f, respectively.

With preferred embodiments, write and read requests originating from the channel adaptors 14A, B, C, D, i.e., the PCI slots, would be queued in separate write 102a, b, c, d and/or read 104a, b, c, d request FIFO buffers at the remote and local ends. Thus, a read or write transaction, illustrated as 100a, b, c, d, e, f, would utilize the corresponding FIFO buffers for the transaction. This FIFO architecture allows multiple agents to simultaneously execute transactions across the bridge structure because each agent's transaction is managed by a separate set of FIFO buffers dedicated to that agent. Transactions across agents are not queued in the same FIFO buffers.

For processor to processor communication, there are a set of buffers for each processor 10 and 12. FIG. 3 shows the FIFO buffers in FIFO buffer sections 80 and 84. FIFO buffers 102e, 106e, 108e, and 112e in FIFO buffers sections 80 and 84 buffer transactions originating from processor 10 to processor 12. FIFO buffers 102f, 106f, 108f, and 112f in FIFO buffers sections 82 and 86 buffer transactions originating from processor 12 to processor 10. Buffer sections 82 and 86 would similarly include two sets of FIFO buffers one for each originating processor 10 and 12. For instance, if a transaction originates at processor 10, the transaction would flow through local bridge 22 and remote PCI bridge 50, and then to processor 12 via remote PCI bridge 52 and local bridge 26. The read/write transaction would be buffered in the read/write FIFO buffers for originating processor 10, e.g., FIFO buffers 102e, 108e, in FIFO buffers 80, 82, 84, and 86. If the transaction is a read, then return data would flow from processor 12, through the read return FIFO buffer for originating processor 10 in FIFO buffers 86 and 82, and then through read return FIFO buffers 106e and 112e in FIFO buffers 80 and 84, respectively. Because there are separate buffers for transactions originating from each processor 10 or 12, the bridge subsystem 8 can concurrently process transactions from processors 10 and 12.

The parallel FIFO architecture allows a disconnected read from one channel adaptor 14A, B, C, D to pass a write from another adaptor. Current PCI rules do not allow reads to pass writes. Preferred embodiments allow a read to pass a write from different channel adaptors 14A, B, C, D because read and write requests originating from different channel adaptors 14A, B, C, D are maintained in separate FIFO buffers. However, in preferred embodiments, within any channel adaptor 14A, B, C, D, a read would not pass a write.

In alternative embodiments, the FIFO buffer sections 80, 82, 84, 86 and data flow paths 100a, b, c, d, e, f may be implemented within the address translator logic 54, 56, 66, 68.

Delayed Read Requests/Prefetching

As discussed, delayed transactions are used to improve transfer efficiency because the master is not required to be connected to the bridge while the bridge completes the transaction. With delayed transactions, the adaptor or other agent releases access to the bus to allow other agents or requests to access the bus while the delayed request is handled by the PCI bridge.

Prefetch refers to the situation where a PCI bridge reads data from a target device before the master requests the data in anticipation that the master agent will need the data. Prefetching reduces the latency of a subsequent burst read transaction because the bridge returns the data before the master actually requests the data. If the channel adaptor has a read request for a variable prefetch data window, then the data may be prefetched up until the buffer is filled or until a predetermined amount is prefetched. Further, the SRAM 74 may be used to maintain a counter to control prefetch operations until all the requested data is prefetched. An algorithm for controlling how much data to prefetch utilizing SRAM 74, 76 is described below.

In preferred embodiments, prefetched data is maintained in the read return FIFO 106a, b, c, d, e, f on an agent by agent basis. If one agent, e.g., adaptor 14A, performing a delayed read request disconnects from the remote PCI bus 44 without reading out all prefetched data maintained in read return FIFO 106a, the unread prefetched data remains in the FIFO read return buffer 106a. Thus, if another agent, e.g., adaptor 14B, issues a read request while adaptor 14A is disconnected, the prefetched data in channel 14A's read return FIFO 106a will not be discarded to make room for any data prefetched or returned in connection with channel adaptor 14B's intervening read request. Instead, any read data returned in connection with channel adaptor 14B's read request will be placed in read return FIFO 106b. Thus, preferred embodiments allow prefetched data to remain buffered for later return to a disconnected read request upon reconnection even if another agent issues an intervening read request.

When an agent, e.g., channel adaptor 14A, reconnects to the bus 44, e.g., remote PCI bus, with a retry and prefetched data is held in the return data FIFO, e.g., FIFO 106a, then the remote PCI bridge 50 will compare the address of the requested read with the address of the prefetched data. If there is a match, then the remote bridge 18 will return the prefetched data to the requesting agent, e.g., channel adaptor 14A. Otherwise, if there is no match, the remote bridge 18 will discard the prefetched data. In preferred embodiments, if the same agent, e.g., channel adaptor 14A, issues a subsequent read request while prefetched data is maintained in the read return FIFO 106a, then such prefetched data will be discarded to make room for data to be read for the subsequent read request from the same agent, e.g., channel adaptor 14A.

Processing Read/Write Transactions

Figure 4A:
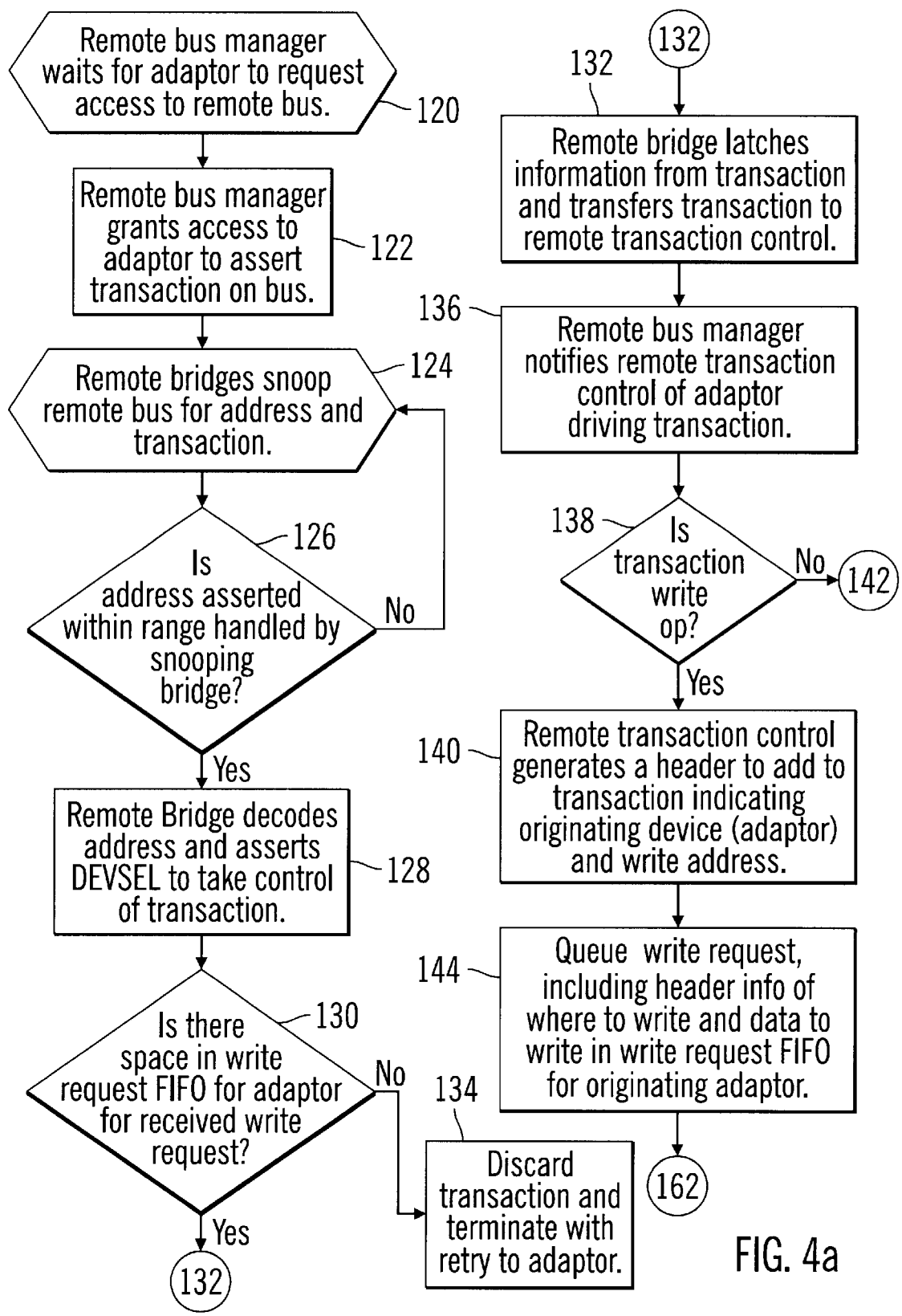
FIGS. 4a, b, and c illustrate logic implemented in the bridge subsystem to process transactions from multiple agents in accordance with preferred embodiments of the present invention.

FIGS. 4a, b, and c illustrate logic implemented within components of the remote 18 and local 22 bridges to execute read/write requests from the adaptors 14A, B, C, D transferred to the remote PCI bus 44. This logic is described with respect to a transfer from channel adaptor 14A to an address within the range handled by remote PCI bridge 50 thru local PCI bridge 70. This logic is identical for remote PCI bridge 52 thru local PCI bridge 72, and for the other local and remote PCI bridges within remote bridge 20 and local bridges 24 and 28.

With respect to FIG. 4a, control begins at block 120 which represents the remote bus manager 46 waiting for a channel adaptor 14A, B, C, D or other device to request access to the remote PCI bus 44. Control transfers to block 122 which represents the remote bus manager 46 granting access to an adaptor, e.g., channel adaptor 14A, to assert a transaction on the bus 44. In the meantime, at block 124, the remote PCI bridges 50, 52 are snooping the remote PCI bus 44 to determine if any transactions asserted on the remote PCI bus 44 are within the address range handled by the snooping PCI bridges 50, 52. If, at block 126, one of the PCI bridges 50, 52 determines that a transaction is within the address range handled by the PCI bridge 50, 52, then control transfers to block 128 which represents a remote PCI bridge asserting control of the address and transaction, e.g., remote PCI bridge 50, by decoding the address and asserting a DEVSEL command. Otherwise, control transfers back to block 124 where the PCI bridges continue to snoop the bus for a transaction within their address ranges.

From block 128, control transfers to block 130, where the transaction control 55 determines whether there is enough space in the write request FIFO to queue another write request. Multiple write transaction may be queued in the write request FIFO 102a; however, only one read request may be queued at a time in the read request FIFO 104a. If there is sufficient space, control transfers to block 132; otherwise, control transfers to block 134 to discard the transaction and terminate with a retry to the originating adaptor 14A. If there is sufficient space, then at block 132 the remote PCI bridge 50 takes control of the transaction latching information from the transaction, such as the PCI command and address, and transfers the transaction to the remote transaction control 55. At block 136, the remote bus manager 46 communicates to the remote transaction control 55 the identity of the channel adaptor originating the transaction, e.g., channel adaptor 14A. The remote bus manager 46 has such information because the remote bus manager 46 previously granted channel adaptor 14A access to the bus as part of the arbiter functions performed by the remote bus manager 46. Control then transfers to block 138 where the transaction control 55 determines whether the transaction is a write operation. If so, control transfers to block 140; otherwise, control transfers to block 142 in FIG. 4b.

At block 140, the remote transaction control 55 generates a header to add to the transaction indicating the originating adaptor 14A and other information, such as the start of the transaction, and if a read transaction, the byte length of the entire transaction. This header would remain with the transaction as it proceeds throughout remote bridge 18 and local bridge 22. Information on the originating adaptor is obtained from the remote bus manager 46 and information on the start of the write address is obtained from the write transaction itself. Control then transfers to block 144 where the transaction control 55 queues the write request, including the address of where to write and the write data, to the write request FIFO 102a for the originating adaptor. The remote address translator 54 uses the header information to select the specific write request FIFO 102a, from write request FIFOs 102a, b, c, d, e, f corresponding to the adaptor 14A originating the request. From block 144, control transfers to block 162 in FIG. 4c

Figure 4B:
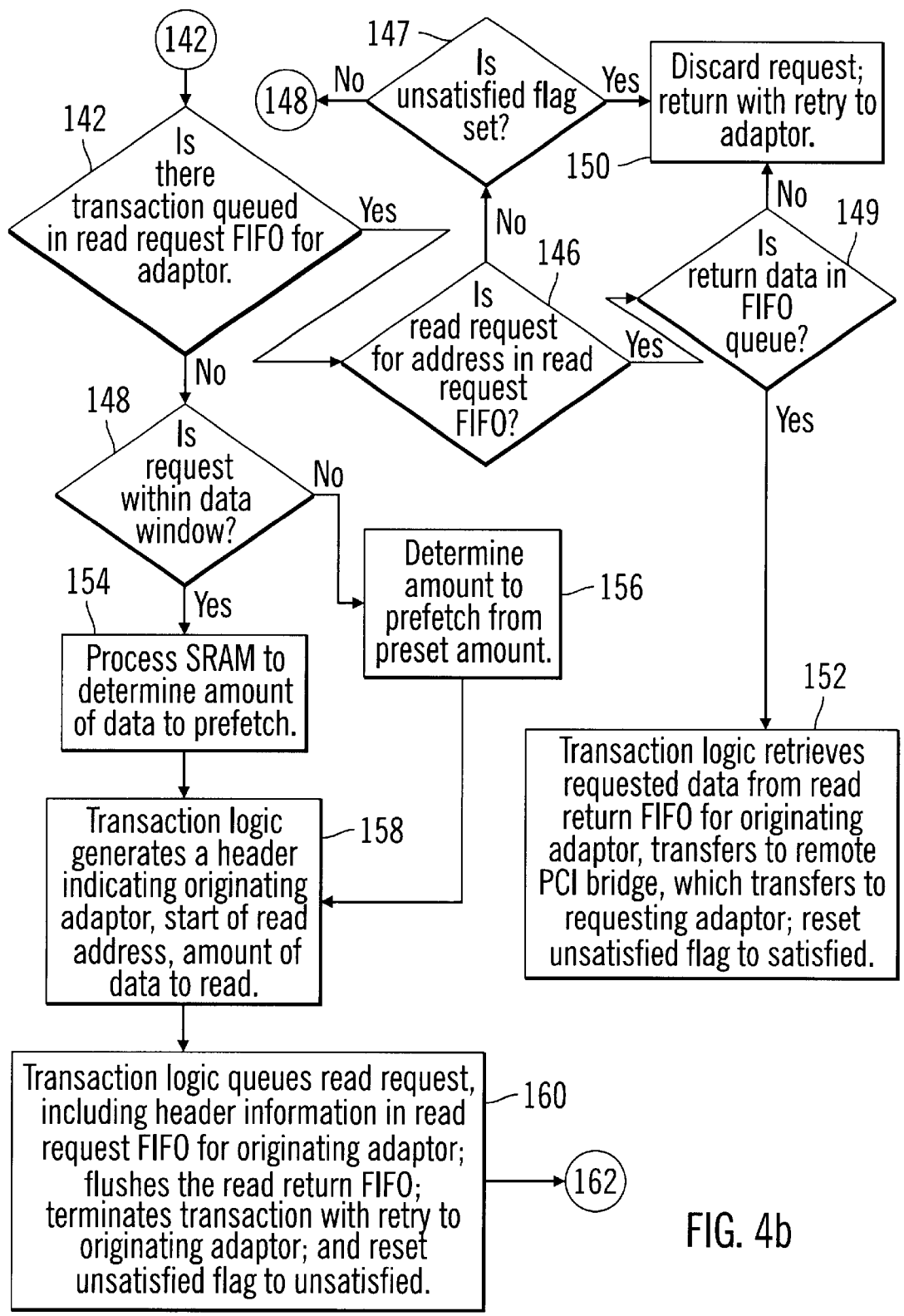

If the transaction is a read request, then at block 142 in FIG. 4b, the transaction control 55 determines whether there is a transaction queued in the read request FIFO 104a for adaptor 14A. As discussed, the remote transaction control 55 is informed by the remote bus manager 46 of the agent originating the transaction, and from this information can select the appropriate FIFO buffer corresponding to the originating agent. If so, control transfers to block 146; otherwise, control transfers to block 148. At block 146, the transaction logic 55 determines whether the address of the start of the received read request matches the address of a previously queued read request in the read request FIFO 104A. A read request may include two flags, a read queued flag indicating whether the request is a queued read request and an unsatisfied read flag indicating whether data has been returned to the requesting agent originating the read request. If the received read request matches the queued request, then control transfers to block 149; otherwise, control transfers to block 147 where the transaction logic 55 determines whether the unsatisfied flag is set to unsatisfied, indicating that read data was not returned to the requesting agent. If the queued read request is unsatisfied, then control transfers to block 150 where the transaction logic 55 discards the request and returns with a retry. Otherwise, if the unsatisfied flag is not set, i.e., data has been returned to the requesting agent for a queued read request, then control transfers to block 148.

At block 149, the transaction logic 55 determines whether return data is in the read return FIFO 106a for the read request. If so, control transfers to block 152 where the transaction logic 55 retrieves the requested data from the read return FIFO 106a for the originating adaptor 14A, transfers the data to the remote PCI bridge 50 for return to the requesting adaptor, and sets the unsatisfied flag to satisfied or FALSE, as data has now been returned for the read request. Otherwise, if the data is not in the read return FIFO 106a, then control transfers to block 150 to discard the request and return with retry.

If there is no queued read request, then control transfers to block 148 where the transaction control 55 determines whether the requested read data address is within a data window, which comprises read requests having a variable prefetch size that needs to be calculated. Data requests that are not within the data window are for a fixed prefetch size. If the read request has a variable prefetch size, then control transfers to block 154; otherwise, control transfers to block 156 to determine the amount to prefetch from a preset prefetch amount. If the request falls within the data window, then control transfers to block 154 where the transaction logic 55 processes the SRAM 74 to determine the amount of data to prefetch. At block 158, the transaction control 55 generates a header indicating the originating adaptor, the start of the read operation, and the amount of data to read. The originating adaptor information is provided by the remote bus manager 46, the start of the read operation is provided by the read request, which is typically a PCI read request from the channel adaptor 14A, and the amount of data to prefetch is obtained from a counter in SRAM 74. Control then transfers to block 160 where the transaction logic 55 queues the read request, including the header information in the read request FIFO 104a, flushes the read return FIFO, sets the unsatisfied flag for the queued read request to unsatisfied or TRUE, and then terminates the transaction with a retry.

Figure 4C:
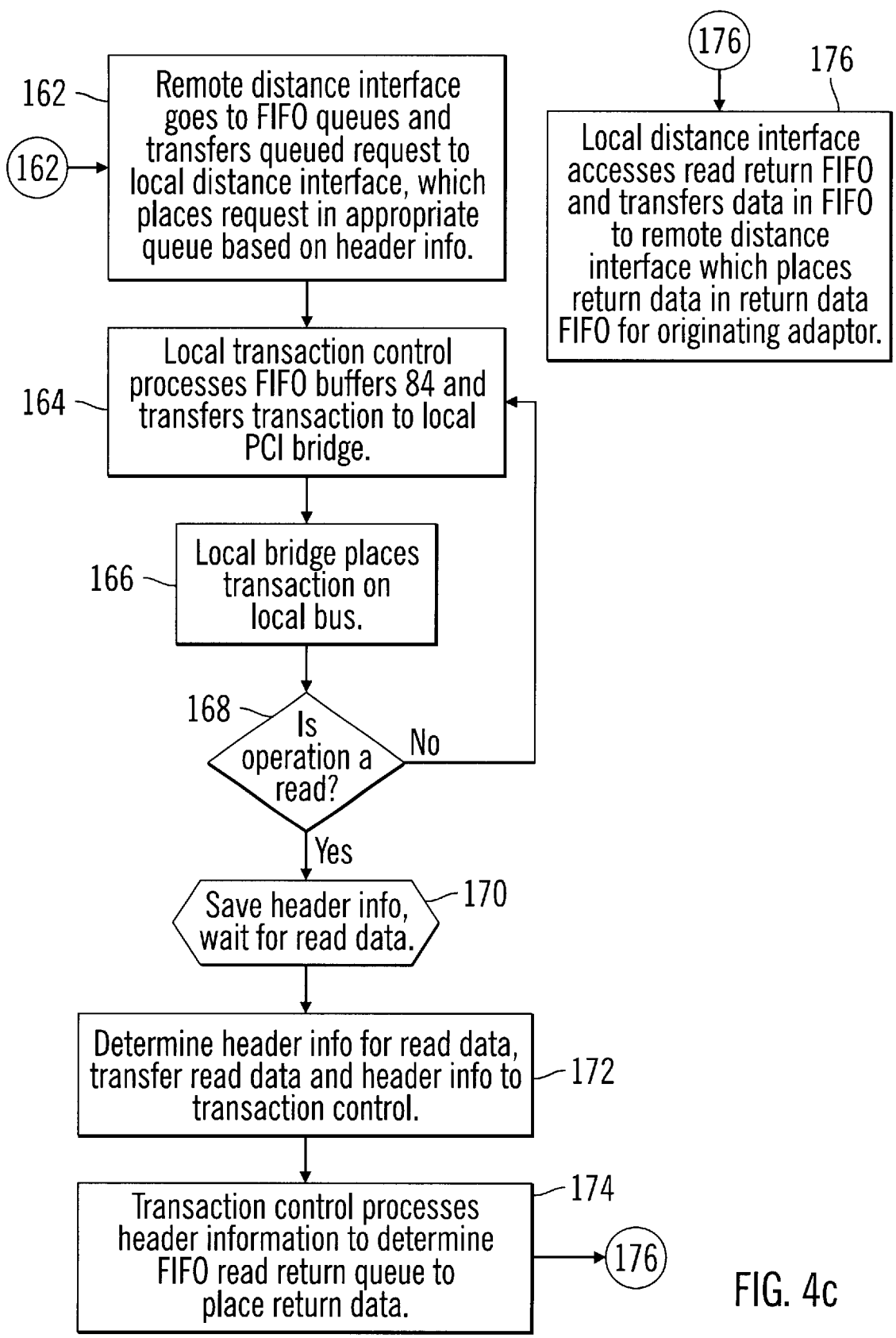

After the read or write request is queued at block 144 (in FIG. 4a) or 160 (in FIG. 4b), control transfers to block 162 in FIG. 4c where the remote distance interface 58 scans the FIFOs 102, 104, and 106 to locate queued requests, and transfers the queued requests, including the header information, to the local distance interface 62, which places the request in the appropriate FIFO buffer based on the header info associated with the requests. Control then transfers to block 164 where the local transaction control 67 processes the FIFO buffers 84 and transfers any queued transactions to the local PCI bridge 70. At block 166, the local PCI bridge 70 places the transaction on the local bus 88. If the operation is a read (block 168), then the local transaction control 67 saves the header info, sets the read queued flag indicating that the read request queued in the read request FIFO 110a is a queued read, saves the header info, and waits for the read data. If the operation is a write, control returns to block 164 to further process the FIFO buffers 84.

Upon receiving the return read data (block 170), the local PCI bridge 70 returns the read data to the local transaction control 67 (block 172). The local PCI bridge 70 can determine from which transaction the return data originated by comparing the received return data and completion status with previously latched information. Such latched information may be maintained in the header information. At block 174, the local transaction control 67 processes the header information to determine the read return FIFO 112a to queue the read return data. At block 176, the local distance interface 62 processes the read return FIFO 112a and transfers any queued data to the remote distance interface 58 to place the return data in the return data FIFO 106a for the originating adaptor. The data is then available for return to the originating adaptor when the originating adaptor retries the read request.

Processor to processor communication is comprised of two components, a first side of flow, from the originating processor to the remote PCI bridge on the side of the originating processor, and a second side flow, from the remote PCI bridge on the side of the target processor to the target processor. FIFO buffers are maintained for each originating processor. Thus, for a transaction originating from processor 10, read/write transactions and read return data flowing through the first and second sides of the flow are maintained in the FIFO buffers for the originating processor 10.

Figure 5A:
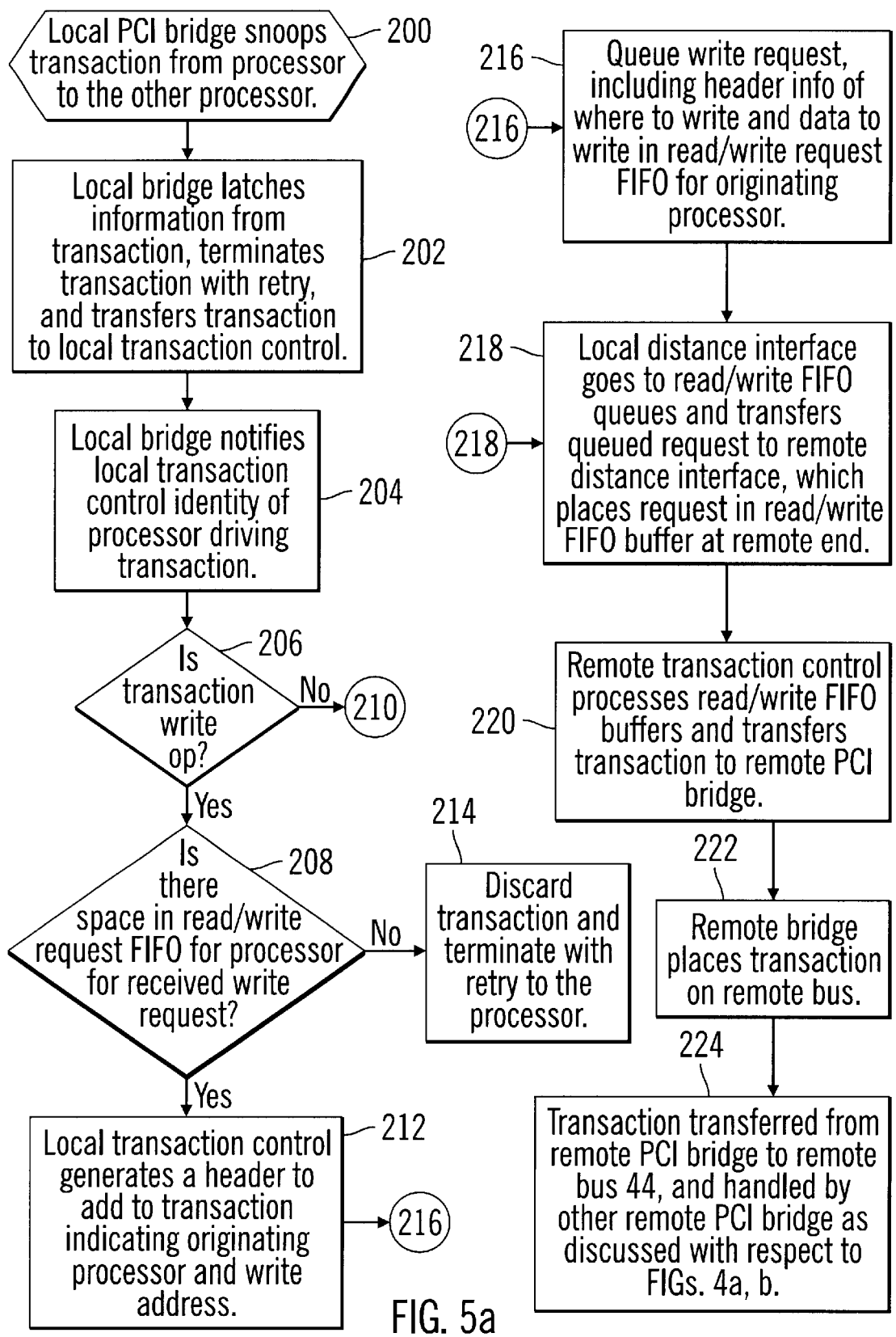
FIGS. 5a, b illustrate logic implemented in the bridge subsystem to process transactions between processors in accordance with preferred embodiments of the present invention.
Figure 5B:
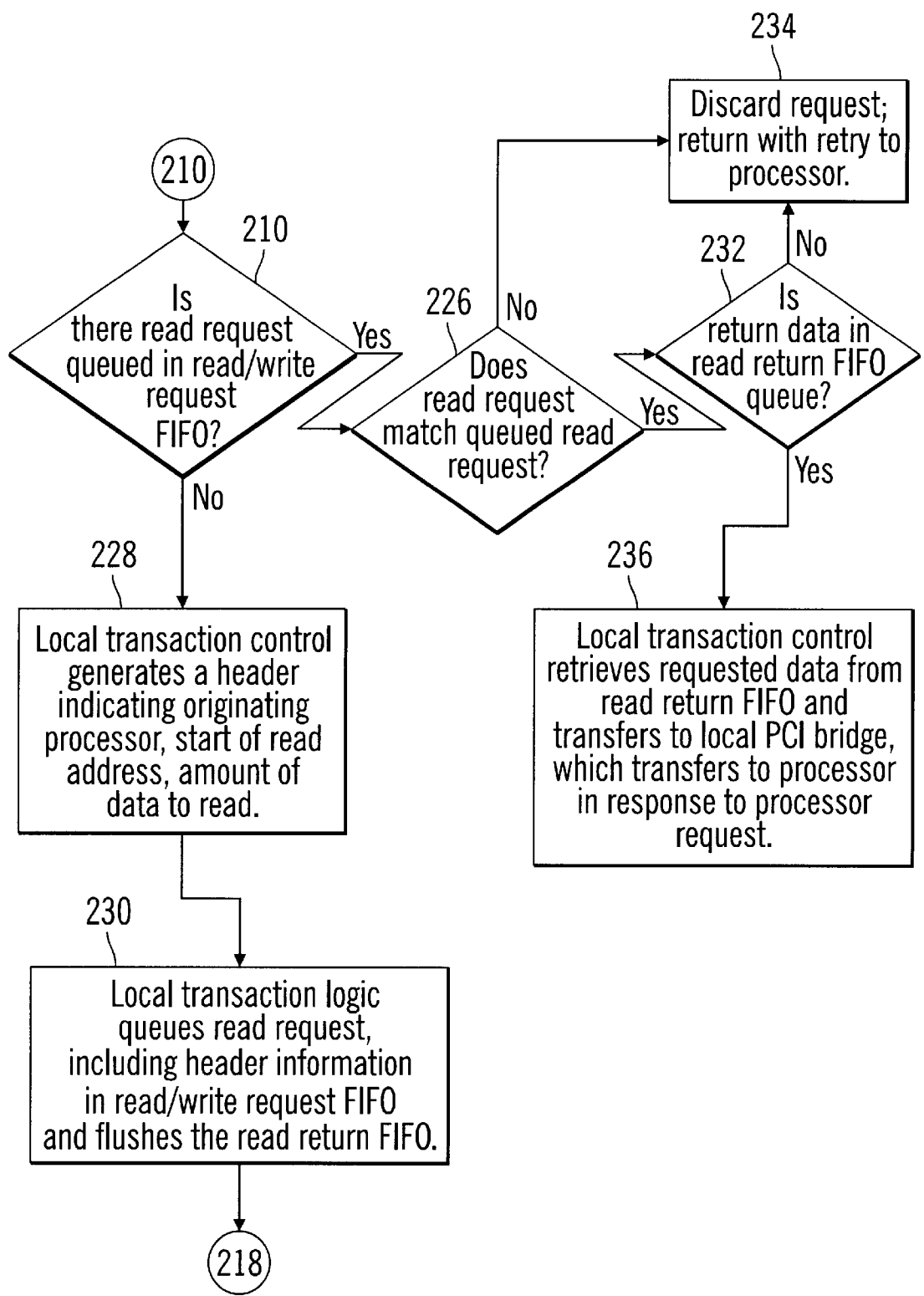

FIGS. 5a and 5b illustrate the logic implemented in the remote bridge system for the first side of the flow 100e, i.e., communicating a processor to processor command from the originating processor, e.g., processor 12, to the remote PCI bus 44. FIGS. 5a, b are described with respect to processor 10 communicating a read transaction to processor 12. However, this logic of FIGS. 5a, b could be implemented within any of the remote bridges 18, 20 and local bridges 22, 24, 26, and 28 to handle flow in any direction between the processors 10 and 12. The second side of the transaction to transfer the read or write request from remote PCI bridge 52 to processor 12 and then return data if the request is a read would follow the logic of FIGS. 4a, b, and c where the remote PCI bridge 52 would snoop the transaction originating from processor 10 off the remote PCI bus 44 as it would snoop a transaction from the adaptors 14A, B, C, D. If the processor-to-processor transaction is a read, then the remote PCI bridge 50 would continue retrying the read request until it received all the requested data, as is the case of the adaptor with respect to the logic of FIGS. 4a, b, and c. Data would be returned on the second side of the target processor 12, e.g., remote bridge 18 and local bridge 26 as discussed with respect to FIGS. 4a, b, and c.

With respect to FIG. 5a, control begins at block 200 which represents the local PCI bridge 70 snooping a transaction asserted from processor 10 on the bus 88 directed toward processor 12 or an adaptor, e.g., adaptor 14A, as the target. Control transfers to block 202 where the local PCI bridge 70 latches information from the transaction, terminates the transaction with a retry and transfers the transaction to the local transaction control 67 for handling. At block 204, the arbiter of bridge 88, which may be implemented within PCI bridge 70, notifies the local transaction control 67 of the identify of the transaction. The local transaction control 67 then determines (at block 206) whether the transaction is a write operation. If so, control transfers to block 208; otherwise, control transfers to block 210. At 208, the transaction control 67 determines whether there is sufficient space in the read/write request FIFO 108e for originating processor 10 for the additional write request. If so, control transfers to block 212; otherwise, the write transaction is discarded and terminated with retry to the processor 10 (at block 214). At block 212, the local transaction control 67 generates a header to add to the transaction indicating the originating processor 10 and the start address of the write operation. After generating the header information, the local transaction control 67 queues the write request (at block 216), including the header info, in the read/write request FIFO 108e.

If the transaction is a read operation, then the local transaction control 67 determines whether there is a read request queued in the read/write request FIFO 108e in FIFO buffer 84 (at block 210, in FIG. 5b). If there is a read request queued, then the local transaction control 67 determines (at block 226) whether the received read request has the same address, i.e., matches, as one of the already queued read requests. If so, the transaction control 67 determines (at block 232) whether there is return data in the read return FIFO 112e for the queued read request for the originating processor 10. If there is no matching queued read request nor return data, then the transaction control 67 discards the request and returns a retry to the processor 10 (at block 234). If there is return data, then the local transaction control 67 retrieves the requested data from the read return FIFO 112e FIFO for the originating processor 12 (at block 236). The return data is transferred to the local PCI bridge 70, which then transfers the data to the processor 10 via the local PCI bus 88.

If there is no queued read request (at block 210), then the local transaction control 67 generates a header indicating the originating processor, start read address, and read transaction length (at block 228). The local transaction control then queues the read request in the read/write request FIFO 108e and flushes the read return FIFO 112e for the originating processor 10.

After the transactions are queued at block 216 or 230, the local distance interface 62 processes (at block 218) the read/write request FIFO 108e and transfers queued requests to the remote distance interface 58, which then places the request in the read/write request FIFO 102e in the remote bridge 18 for originating processor 10. The remote transaction control 55 (at block 220) processes the read/write request FIFO 102e and transfers the transaction to the remote PCI bridge 50. The remote PCI bridge 50 (at block 222) then asserts the transaction on the remote PCI bus 44. The remote PCI bridge 52 on the second side would then process the transaction transferred by the opposite remote PCI bridge 50 over the remote PCI bus 44 using the logic of FIGS. 4a, b, and c and treat the transaction as if it was received from an adaptor 14A, B, C, D. One difference with how the second side processes the request from the logic of FIGS. 4a, b, c is that the second side between remote PCI bridge 52 and local PCI bridge 72 queue both read and write requests in a single downstream read/write request FIFO, as opposed to separate read and write FIFOs used for requests from the adaptors 14A, B, C, D.

In preferred embodiments, the logic of FIGS. 4a, b, c and 5a, b could be executed simultaneously within the bridge subsystem 8 for a read/write transaction from different agents. For instance, channel adaptors 14A, B, C, D could each simultaneously execute a read/write transaction on the remote PCI bus 44 and the transactions could simultaneously be buffered in the FIFO buffers 102a, b, c, d; 104a, b, c, d; 108a, b, c, d; and/or 110a, b, c, d, to process in parallel. Moreover, because separate buffers are maintained for transactions originating from the processors 10 and 12, transactions originating from the channel adaptors 14A, B, C, D as well as the processors 10 and 12 may also be concurrently queued and executed. In this way, the bridge subsystem 8 could process in parallel read/write transactions from different agents at the same time.

Certain of the operations described above are performed asynchronously by the different components within the bridge subsystem 8. For instance, the following operations are performed asynchronously of other operations: the remote 50, 52 bridges snooping the remote PCI bus 44; the local 70, 72 bridges snooping PCI busses 88 and 90, respectively; the remote distance interfaces 58, 60 scanning the FIFO buffers 80, 82, respectively, for transactions to transfer to the local bridges 22, 26; the local distance interfaces 62, 64 scanning the FIFO buffers 84, 86, respectively, for transactions to transfer to the remote distance interfaces 58, 60; the local PCI bridges 70, 72 snooping the local busses 88, 90, respectively, for transactions from the processors 10, 12; and the processors 10, 12 and channel adaptors 14A, B, C, D retrying read operations. Other operations are performed in response to the occurrence of a particular event. For instance, in preferred embodiments, the transaction control 55, 57, 67, and 69 buffer transactions in response to receiving transactions from the PCI bridges 50, 52 and distance interfaces 58, 60, 62, 64.

In preferred embodiments, the following PCI ordering rules for a bridge, described in the "PCI Local Bus Specification, Version 2.2," are followed within each adaptor 14A, B, C, D:

Rule 1—A subsequent posted memory write cannot pass a previously accepted posted memory write.

Rule 2—A read transaction must push posted write data to maintain ordering.

Rule 3—A non-postable write transaction must push posted write data to maintain ordering.

Rule 4—A read transaction must pull write data back to the originating bus of the read transaction.

Rule 5—A Posted Memory Write must be allowed to pass a Delayed Request (read or write) to avoid deadlocks.

Rule 6—Delayed Completion (read and write) must be allowed to pass Delayed Requests (read or write) to avoid deadlocks.

Rule 7—A Posted Memory Write must be allowed to pass a Delayed Completion (read or write) to avoid deadlocks.

Notwithstanding the above current PCI rules, in preferred embodiments, a read transaction from one agent, e.g., adaptor 14A, may pass a write from another adaptor, e.g., adaptor 14B, because the bridge subsystem 8 processes reads and writes from different agents concurrently, using different FIFO buffers. Thus, while the preferred embodiments violate the PCI rules for the ordering of transactions between agents, preferred embodiments conform with the rules for transactions within any given agent.

Algorithm for Controlling Prefetch Operations

An adaptor 14A, B, C, D may issue a read request for variable prefetch size within the data window that may cover a 256 MB ("megabyte") address range. The SRAMs 74 and 76 would maintain counters for use in determining how much data to prefetch within the data window address range. In preferred embodiments, the SRAMs 74 and 76 may maintain a counter for each track of data within the data window. Thus, the number of counters implemented in the SRAM 74 and 76 would equal the data window size divided by the track size. Further, the SRAM 74, 76 would maintain a set of counters for every track for each adaptor 14A, B, C, D. Thus, if the data window was 256 Mb, and the track size is 64 KB, then the SRAM 74, 76 would provide 4096 counters shared across agents or adaptors.

The remote transaction control 55 and 57 determines which counter to use based on the address of the requested track. The remote transaction control 55 and 57 would use the high order address bits of the read request to index the counter in the SRAM corresponding to the track including the requested data. In preferred embodiments, the device that manages the directory structure of the target will perform set-up operations to set the values in the counter. For this reason, in preferred embodiments, the processor 10 or 12 that is the target of the read request from the adaptor 14A, B, C or D would set up the counters in the SRAM 74 or 76.

Figure 6A:
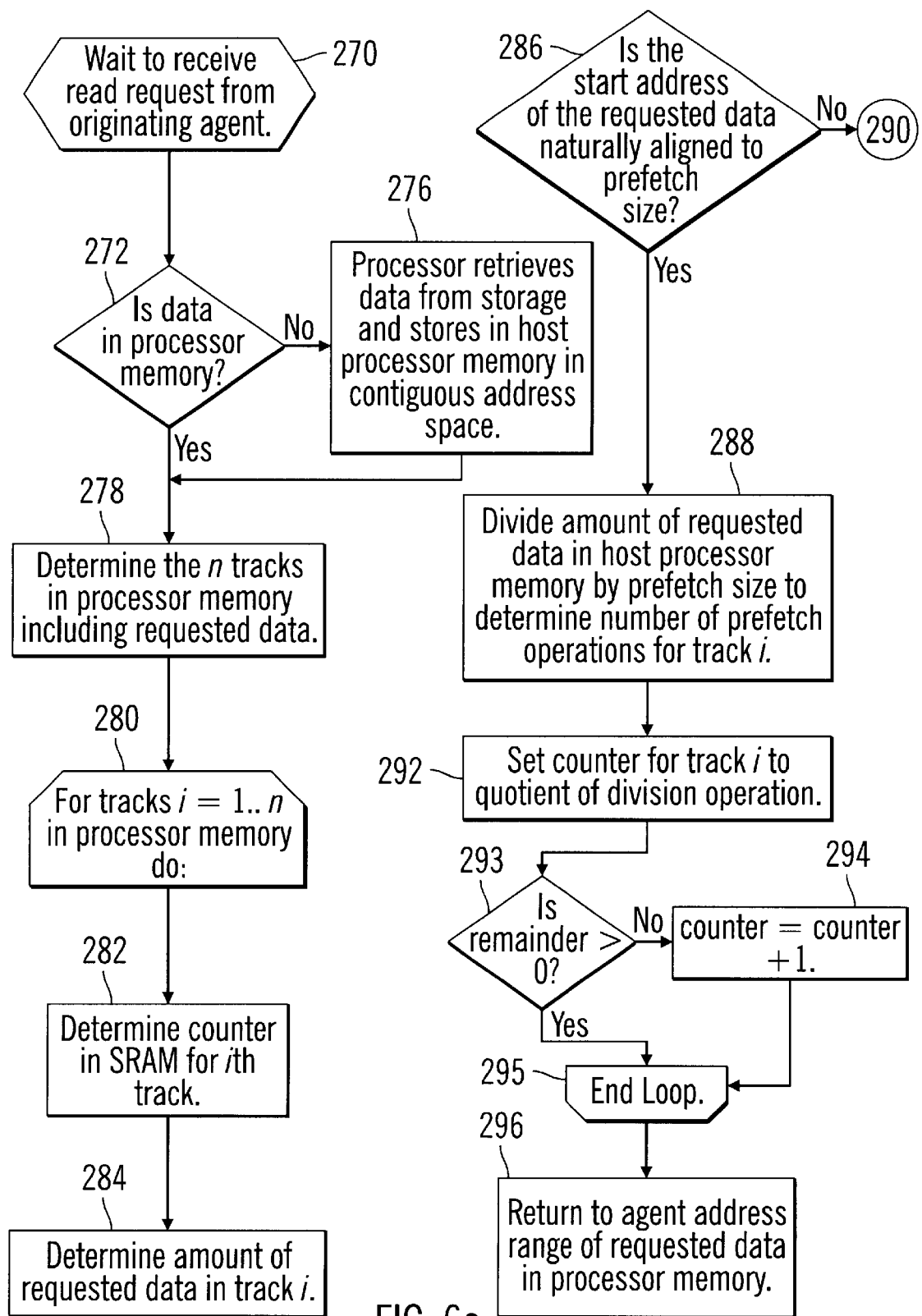
FIGS. 6a, b illustrate logic implemented in a target processor to initialize counters in the bridge system in accordance with preferred embodiments of the present invention.

FIGS. 6a, b illustrate logic implemented in the target of the agent's request, e.g., processor 10, to set up the counters in the SRAM 74. The agent adaptor 14A, B, C or D would issue a read command to the processor 10 or 12, such as a SCSI read command, requesting the data. At block 270, the processor 10 waits to receive a read request from an originating agent, e.g., adaptor 14A. The read request, e.g., SCSI read command or CKD (Count-Key-Data) command, would include the start byte of the read transaction and the transaction length. Control transfers to block 272 which represents the processor 10 determining whether the requested data is in the processor 10 memory (not shown), which is preferably a volatile memory device, such as a RAM, DRAM, etc. If so, control transfers to block 278; otherwise, control transfers to block 276 which represents the processor 10 retrieving the requested data from storage and storing the data in the processor 10 memory. In preferred embodiments, the processor 10, using memory management techniques known in the art, will page data into the processor memory such that the data will be stored contiguously in the processor memory, thereby providing the requesting agent adaptor 14A the data in a contiguous address range. Although the data may appear to the adaptor to be stored contiguously, in the physical storage space of the processor memory, the data may in fact be stored non-contiguous.

From block 276 or the yes branch of block 272, control transfers to block 278 where the processor 10 determines the number of n tracks in processor memory that include the requested data, where n may be a number from one to the total number of tracks in processor 10 memory. If the requested data is maintained within only a single track, then n=1. Control then transfers to block 280 where the processor 10 begins a loop for each track i. Within the loop, control transfers to block 282 where the processor 10 determines the counter in SRAM 74 corresponding to track i. The SRAM 74 would include an index corresponding each counter in the SRAM 74 to the high order bits of an address. The processor 10 may determine the counter for track i by using the high order address bits of track i to locate the corresponding counter in the SRAM 74 index. Control then transfers to block 284 where the processor 10 determines the amount of the requested data in track i. For instance, the entire track may be filled with requested data or only a portion of the track may include the requested data. The processor can make such a determination because the processor knows the start and transfer length of the read request. From this information, the processor knows the end address of the read request and can determine whether the end address of the read request is within track i's address range.

Control then transfers to block 286 where the processor 10 determines whether the start address of the requested data is aligned with the prefetch size. A start address is aligned if the start address is an integer multiple of the prefetch size. For instance, if the prefetch size is 512 bytes, then the start address is aligned with the prefetch size if the starting address is at the 0 location or a location that is a multiple of 512. If the start address of the read is aligned with the prefetch size, then the processor 10 (at block 288) determines the number of prefetch operations needed to prefetch all the requested data in track i, by dividing the amount of requested data in track i by the prefetch size. For instance, if the prefetch size, i.e., amount of data prefetched in a prefetch operation is 512 bytes, then the processor 10 would determine the number of prefetch operations by dividing the amount of requested data in track i by 512 bytes. For instance, if the entire track, e.g., 64 KB, was to be returned, then the processor 10 would set the counter for that track to 128 (64 KB divided by 512 bytes). If only 32 KB of the track included requested data, then the processor 10 would set the counter for the track to 64. Control transfers to block 292 where the processor sets the counter for track i to the quotient of the division operation at block 288. If the remainder of the division operation at block 288 is greater than zero (at block 293), then the processor 10 (at block 294) would set the counter to counter +1. From the no branch of 293 and 294, control transfers to block 295 where the loop ends and returns to block 280 to begin the loop for the next track (i+1). The remainder of the division operation at block 288 would be greater than zero if the prefetch started aligned with the prefetch start of a prefetch group but does not extend the entire prefetch group size, i.e., the prefetch extends from blocks 0 to 400. If all the counters for the n tracks including requested data have been set, then control transfers to block 296 where the processor 10 returns to the requesting agent, e.g., adaptor 14A, the address range of the requested data in processor 10 memory.

Figure 6B:
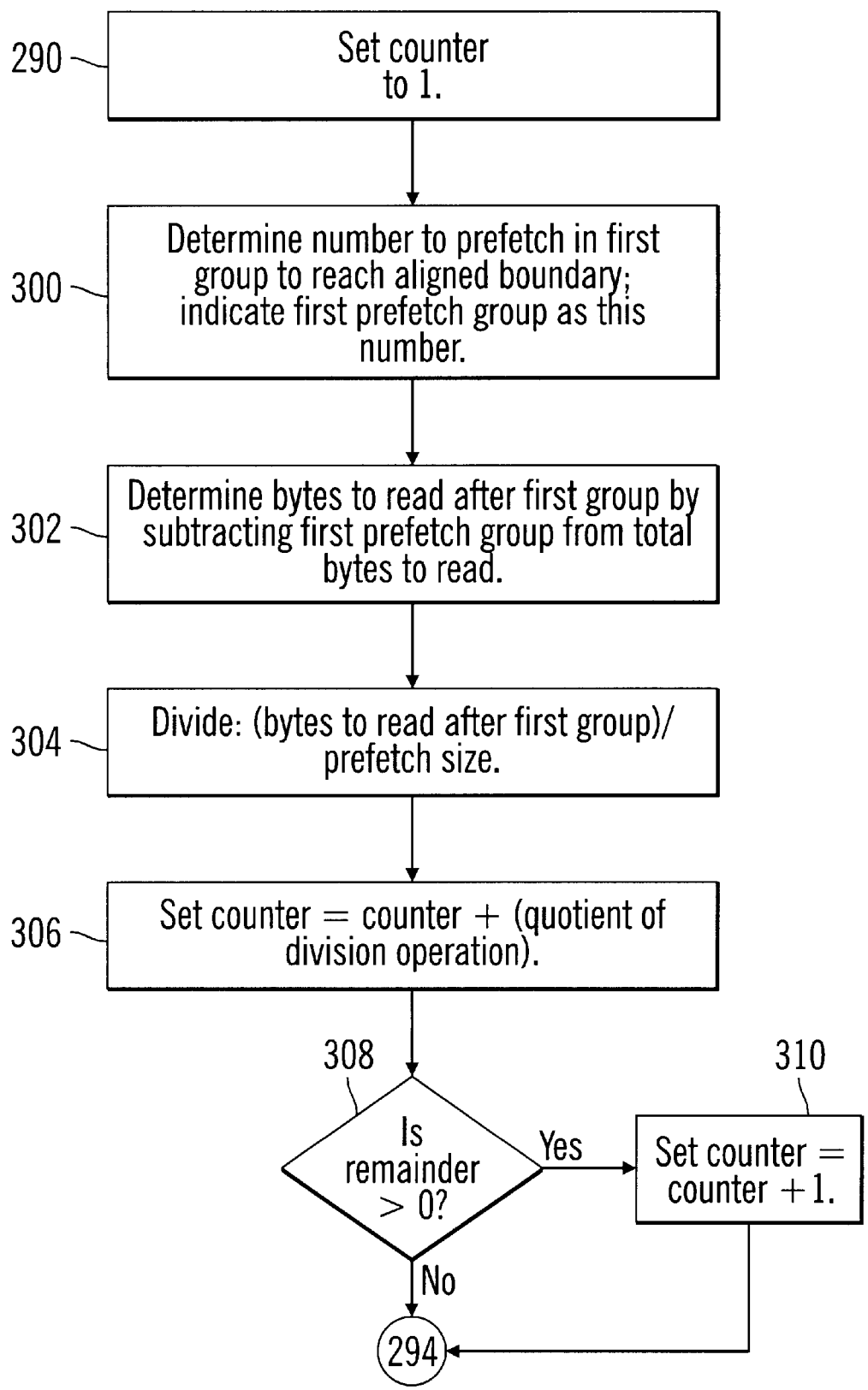

If the starting address for the track is not naturally aligned, then the processor 10 sets (at block 290 in FIG. 6b) the counter for the ith track to one. The processor 10 then determines (at block 300) the number of sectors to prefetch in the first group to reach the aligned boundary of the prefetch size. This calculated amount is the first prefetch group. For instance, if the prefetch size is 512 bytes and the starting address is at the fourth byte, then the first prefetch group is 508 bytes. The processor 10 then calculates (at block 302) the bytes to read after the first prefetch group by subtracting the first prefetch group from the total bytes to read for the ith track, where i is the current iteration of the loop. The processor divides (at block 304) the bytes to read after the first group by the prefetch size. The processor 10 then sets the counter (at block 306) to the previous value of the counter plus the quotient of the division operation performed at block 304. If the remainder of the division operation at block 34 is greater than zero (at block 308), then the processor increments the counter (at block 310) by one. Otherwise, the processor 10 terminates the loop at block 295.

With the logic of blocks 300–310, the processor 10 adds one to the prefetch counter for the first prefetch group, which is less than the total prefetch size, adds the number of times the prefetch size goes into the remaining amount to prefetch, and adds one to the counter for the final prefetch group which may not fill up an entire prefetch group. Nonetheless, in preferred embodiments, the entire prefetch group for the last group is prefetched even if the last portion of the request only comprises a portion of an entire prefetch group. Further, in preferred embodiments, the exact size of the determined first prefetch group is prefetched. For instance, if the read request is for bytes 4 to 1024, then the first prefetch group is 508, the number of bytes to reach the end of a prefetch group size, e.g., 512 bytes. The next prefetch group is 512. With four bytes to prefetch remaining, the final prefetch group is 512. As discussed, in preferred embodiments, an entire prefetch group is prefetched for the last prefetch operation for the track, even if the remaining amount to prefetch is less than 512 bytes, e.g., four bytes.

After the requesting agent adaptor 14A, B, C or D receives the address range from the processor 10 or 12 (at block 296) including the requested data as a result of block 274, the agent adaptor 14A, B, C or D then divides the entire read request into a number of smaller read requests to execute over the remote PCI bus 44. For instance, the adaptor 14A, B, C or D may break the read request into smaller component read requests, e.g., in 128 byte increments. By dividing a larger request into smaller component requests, the amount of time any one adaptor 14A, B, C or D is controlling the remote PCI bus 44 is limited, thereby reducing the latency time for other agents to access the remote bus 44. Thus, these smaller component requests from different agents are serialized to allow time division multiplexing of transactions for multiple channel adaptors 14A, B, C, D.

Figure 7:
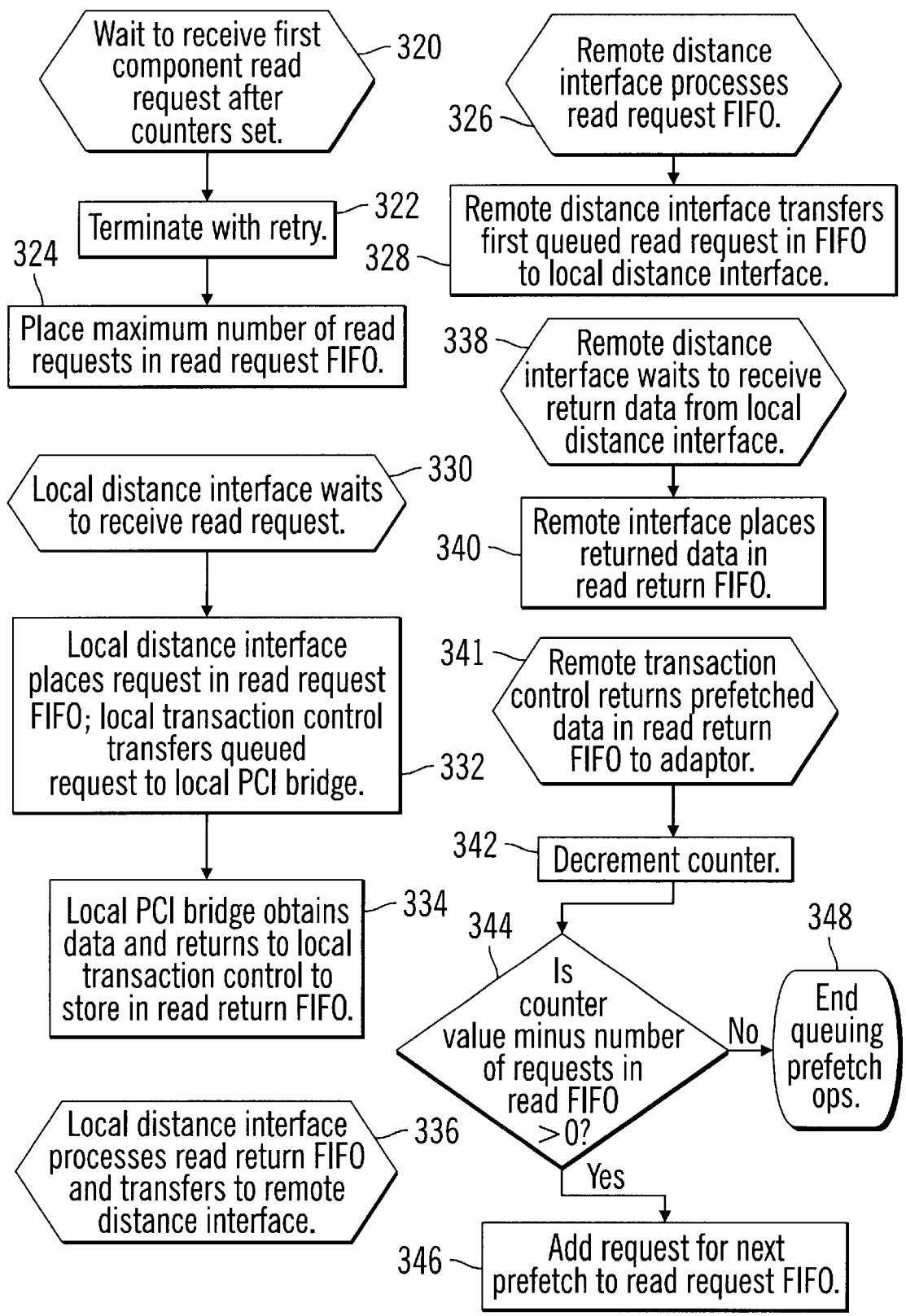
FIG. 7 illustrates logic implemented in the bridge system to prefetch data in accordance with preferred embodiments of the present invention.

FIG. 7 illustrates logic implemented in the remote 18 and 20 and local bridges 22, 24, 26, and 28 to prefetch data after the SRAM counters 74 or 76 are set-up according to the logic of FIG. 6. The threads beginning at blocks 320, 326, 338, and 341 are implemented in one side of the remote bridges 18 and 20, e.g., the side of remote PCI bridge 50 or 52. The threads beginning at blocks 330 and 336 are implemented in the local bridges 22, 24, 26, and 28. At block 320, the remote PCI bridge, e.g., 50, waits to receive the first component read request after the counters in the SRAM 74 are set by processor 10. Control transfers to block 322 where the PCI remote bridge 50 terminates with a retry to have the requesting agent, e.g., adaptor 14A, retry the request after data is prefetched. Control then transfers to block 324 where the remote transaction logic 55 places the maximum number of prefetch requests that may be queued at a time in read request FIFO 104a, e.g., four prefetch requests. If the calculated prefetch count is less than the maximum allowed number of prefetch operations that may be queued in the read request FIFO 104a, then all the prefetch operations are queued in the read request FIFO 104a. The number of queued prefetch requests may be limited to avoid overloading the FIFO buffer 106a/112a with returned data. In this way, the remote bridge 18 or 20 initializes the prefetch operations to start prefetching data.

Block 326 represents the remote distance interface 58 scanning the read request FIFO buffer 104a to process the queued prefetch requests. Control then transfers to block 328 where the remote distance interface transfers the first prefetch request in the FIFO 104a to the local distance interface 62 in local bridge 22.

Block 330 represents the local distance interface 62 waiting to receive requests or data from the remote distance interface 58. Upon receiving a read request, control transfers to block 332 where the local distance interface 62 places the read request in the read request FIFO 110a. The local transaction control 67 then transfers the queued request to the local PCI bridge 70. At block 334, the local PCI bridge 70 asserts the request on the local bus 88 and obtains the requested data to return to the transaction control 67 for storage in the read return FIFO 112a. The local bridge 70 may process the read 110a and write 108a request FIFOs asynchronously of other operations.

Block 336 represents the local distance interface 62 processing the read return FIFO 112a and transferring the read return data to the remote distance interface 58. The local distance interface 62 may process the read return FIFO 112a asynchronously of other operations.

Block 338 represents the remote distance interface 58 waiting to receive return data from the local distance interface 62. Upon receiving return data, control transfers to block 340 which represents the remote distance interface 58 placing the returned data in the read return FIFO 106c.

Block 341 represents the remote transaction logic 67 waiting to return the prefetched data in the read return FIFO 106a to the originating adaptor 14A, via the remote PCI bridge 50, in response to a PCI delayed read request. Upon returning the data, control transfers to block 342 where the remote transaction control 55 decrements the prefetch counter as one prefetch operation has been completed upon returning read return data to the originating adaptor 14A. Control then transfers to block 344 where the remote transaction logic 55 determines whether the counter value minus the number of requests queued in the read return FIFO 106a is greater than zero, i.e., more prefetch operations need to be queued in order to prefetch all the requested data. If so, control transfers to block 346 to add a read request to the FIFO buffer 104a to prefetch the next prefetch amount, e.g., 512 bytes, from the processor 10. Otherwise, if no further prefetch operations need to be queued, then control transfers to block 348 to terminate queuing prefetch requests.

In this way, the bridge subsystem 8 will prefetch enough data to satisfy the component read requests from the requesting agent. Further, with preferred embodiments, the bridge subsystem 8 will prefetch data ahead of the agent's component read requests because the agent's requests are an amount, e.g., 128 bytes, that is smaller than the prefetch size for each prefetch, e.g., 512 bytes. Moreover, the bridge subsystem 8 may concurrently prefetch data for multiple agents. The agents may multiplex their component read requests on the remote PCI bus 44. Because the bridge subsystem 8 is time multiplexing prefetch operations between agents, the bridge subsystem 8 will be able to satisfy a component read request from the time multiplexed agents from prefetched data. In this way, latency times are reduced because the agent's requests are satisfied from prefetched data. Moreover, the agents' component read requests are asynchronous with prefetching operations. This allows the bridge subsystem 8 to prefetch data for one agent, while returning prefetched data to another agent, thereby maintaining prefetched data for multiple agents. Moreover, the use of the SRAM 74, 76 counters in the preferred embodiments restricts the bridge subsystem 8 to prefetching ahead only that data that is needed to satisfy the read request.

Alternative Embodiments and Conclusions

This concludes the description of the preferred embodiments of the invention. The following describes some alternative embodiments for accomplishing the present invention.

In the preferred embodiments, the devices attached to the bridge subsystem 8 that communicate with the processors 10, 12 are channel adaptors. However, in alternative embodiments devices other than channel adaptors may be linked to the bridge subsystem 8 to communicate with the processors 10, 12, or other target devices. In still further embodiments, additional devices may be added to the bridge subsystem 8. Additional devices may be attached to a remote bridge 18, 20. For each agent that may communicate with the bridge subsystem, there may be a set of FIFO buffers to allow the bridge system to process transactions from that agent independently of other agents. In further embodiments, certain agents may share the same set of FIFO buffers to queue their transactions.

Alternatively, the bridge subsystem 8 could include additional remote and local bridges to provide communication between the additional devices and/or processors 10, 12. For instance, additional processors may be added as bus masters to the bridge subsystem 8. In such case, additional local bridges would be added to the bridge subsystem to link the additional processor bus master to the remote bridges 18, 20 and attached devices, e.g., channel adaptors 14, 16. If an additional device is added, then an additional remote bridge and local bridges may be added to provide an additional data path from the added device to the processors. In still further embodiments, both additional processors and remote bridges may be added.

The difference with how the first and second parts of processor-to-processor transaction is processed using a single read/write request FIFO, as opposed to separate read and write FIFOs used during adaptor-to-processor transactions is a matter of design choice. Accordingly, a single FIFO or separate read/write FIFOs could be used to queue the transaction requests for any agent.

The preferred bridge subsystem 8 embodiment utilizes the PCI to PCI bridge architecture. However, in alternative embodiments technology different from the PCI bridge architecture may be used to implement the bridge subsystem 8. The bridge components within the bridge subsystem 8 may communicate via local busses that interconnect the bridge components and function as primary and secondary interfaces.

Certain logic was described as being performed by specific components, such as the remote bus manager 46, remote PCI bridges 50, 52, remote distance interfaces 58, 60, transaction control, etc. However, functions described as being implemented within specific components may be implemented elsewhere. For instance, the arbiter functions handled by the remote bus manager 46 may be implemented within the remote PCI bridges. Moreover, the transaction control functions may be implemented within the remote address translator circuitry or separately.

The logic of the bridge subsystem, described with respect to the flowcharts, may be implemented in programmable gate arrays, such as a filled programmable gate array (FPGA) or complex programmable logic device (CPLD). In this way, the logic may be updated or reconfigured from files maintained in a non-volatile memory device that is part of the bridge subsystem 8. These files including the code needed to configure the logic may be retrieved from over a network or from a provided memory device, such as a CD-ROM. Such readily programmable logic is especially useful for the initial introduction of a product where updates and fixes may need to be provided. Alternative embodiments may be implemented in non-programmable logic, such as application specific integrated circuits (ASICs), which are typically less expensive than the programmable logic devices.

The preferred logic may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize many modifications may be made to this configuration without departing from the scope of the present invention.

In preferred embodiments, multiple operations, such as read requests and prefetch operations, are time division multiplexed. For instance, if multiple prefetch operations for multiple read requests from the same agent and/or multiple requests from different agents needed to be handled, the bridge subsystem 8 would use time division multiplexing to sequence through these multiple prefetch operations. However, in alternative embodiments different techniques may be used to process multiple requests.

Preferred embodiments were described with respect to the channel adaptors 14A, B, C, D functioning as agents. However, in alternative embodiments, any adaptor device or device capable of communicating on a bus may be substituted for the channel adaptors 14A, B, C D, which represent PCI slots for the remote PCI bus 44. For instance, device adaptors, SCSI adaptors, etc. may be substituted for one or more of the channel adaptors.

Preferred embodiments were described with respect to a bridge subsystem 8 that included remote and local bridges. However, those skilled in the art will appreciate how the parallel FIFO structure may be implemented within any number of PCI bridges in a bridge subsystem, such as one or more bridges, providing communication between different busses and devices. For instance, if only one PCI bridge is used to provide communication between busses, then such PCI bridge would include a set of FIFO buffers, e.g., a read request FIFO, write request FIFO, and read return FIFO or, alternatively, a read/write request FIFO and read return FIFO. In this way, the PCI bridge could process in parallel read/write transactions from multiple agents that communicate on a bus with which the PCI bridge interfaces.

Preferred embodiments are intended for fundamental, atomic read/write operations where the adaptors 14A, B, C, D may read, prefetch or write data to the memory of the processors 10, 12. However, in alternative embodiments, the logic of FIGS. 4a, b may apply to any type of read/write operation transacted across a bridge system when there are multiple agents that may assert transactions across the bridge. For instance, the logic of FIGS. 4a, b may be executed when adaptors 14A, B, C, and D concurrently issue a read/write request toward a data storage device in communication with the bridge subsystem 8.

Preferred embodiments were described with respect to FIFO buffers. However, in alternative embodiments different types of buffers, other than FIFO, may be employed to queue the read/write transactions and return data. In summary, preferred embodiments in accordance with the present invention provide an improved bridge system and method for prefetching data to return to a read request from an agent. The bridge system includes at least one memory device including a counter indicating a number of prefetch operations to perform to prefetch all the requested data, a first buffer capable of storing prefetch requests, and a second buffer capable of storing read data. Control logic implemented in the bridge system includes means for queuing at least one prefetch operation in the first buffer while the counter is greater than zero. The control logic then executes a queued prefetch operation, subsequently receives the prefetched data, and stores the prefetched data in the second buffer. The stored prefetched data is returned to the requesting agent.

The foregoing description of the preferred embodiments of the invention has been presented For the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for performing initialization operations in response to a read request from an agent device via a bridge system, comprising:

receiving a read request indicating a start address of requested data and a transaction length of the read request from the agent via the bridge system;

determining an address range including the requested data;

determining a counter in a memory device corresponding to the determined address range; and setting the counter to a number equal to a number of prefetch operations needed to prefetch all the requested data in the address range, wherein the counter is decremented when a prefetch operation is performed.

2. The method of claim 1, wherein the step of determining the address range comprises determining tracks that include the requested data, wherein the step of determining the counter comprises determining a counter for each of the determined tracks, and wherein the step of setting the counter comprises setting each counter to the number of prefetch operations needed to prefetch all the requested data from the track corresponding to the counter.

3. A method for prefetching data to return to a read request from a requesting agent, comprising the steps of:

providing a counter indicating a number of prefetch operations to perform to prefetch all requested data;

prefetching data, while the counter is greater than zero, by performing the steps of:

(i) queuing at least one prefetch operation;

(ii) executing a queued prefetch operation;

(iii) receiving the prefetched data; and (iv) decrementing the counter; and retuning the prefetched data to the requesting agent.

4. The method of claim 3, wherein the step of queuing at least one prefetch operation comprises queuing a plurality of prefetch operations, further comprising the steps of:
   determining whether there are further prefetch operations to queue to prefetch all the requested data; and
   adding a prefetch operation to the queue after decrementing the counter and determining that there are further prefetch operations to queue.

5. The method of claim 3, wherein data is prefetched for multiple read requests from multiple agents, wherein the step of providing a counter comprises providing a counter for each requesting agent, wherein the step of queuing the prefetch operations comprises queuing in separate queues the prefetch operations for the read requests from the multiple requesting agents, wherein prefetch operations are simultaneously queued for different requesting agents.

6. The method of claim 5, wherein prefetch operations are executed in different queues by time division multiplexing the prefetch operations in different queues.

7. A method for prefetching data to return to a read request from a requesting agent, comprising:
   providing a counter for each of a plurality of tracks including the requested data, wherein each counter indicates a number of prefetch operations to perform to prefetch all requested data in the track corresponding to the counter;
   prefetching data, while the counter is greater than zero, by performing, for each counter:
      (i) queuing at least one prefetch operation;
      (ii) executing a queued prefetch operation;
      (iii) receiving the prefetched data; and
      (iv) decrementing the counter; and
   returning the prefetched data to the requesting agent.

8. A method for prefetching data to return to a read request from a requesting agent, comprising:
   providing counters indicating a number of prefetch operations to perform to prefetch all requested data, wherein data is prefetched for multiple read requests from a single agent, and wherein a counter is provided for each of the multiple read requests from the single agent;
   prefetching data, while the counter is greater than zero, by performing the steps of:
      (i) queuing at least one prefetch operation;
      (ii) executing a queued prefetch operation;
      (iii) receiving the prefetched data; and
      (iv) decrementing the counter; and
   returning the prefetched data to the requesting agent.

9. The method of claim 8, wherein the step of executing the queued prefetch operations comprises time division multiplexing the prefetch operations for the multiple read requests from the same agent.

10. A bridge system for prefetching data to return to a read request from an agent, comprising:
    (a) at least one memory device including:
       (i) a counter indicating a number of prefetch operations to perform to prefetch all requested data;
       (ii) a first buffer capable of storing prefetch requests; and
       (iii) a second buffer capable of storing read data; and
    (b) control logic for prefetching data comprising:
       (i) means for queuing at least one prefetch operation in the first buffer while the counter is greater than zero;
       (ii) means for executing a queued prefetch operation; and
       (iii) means for receiving the prefetched data and storing the prefetched data in the second buffer, wherein the stored prefetched data is returned to the requesting agent.

11. The bridge system of claim 10, wherein multiple tracks include the requested data, wherein the memory device includes a counter for each of the plurality of tracks including the requested data, wherein each counter indicates a number of prefetch operations to perform to prefetch all the requested data in the track corresponding to the counter, and wherein the control logic includes means for prefetching the data for each counter and storing the prefetched data in the second buffer.

12. The bridge system of claim 10, wherein the first buffer is capable of queuing multiple prefetch operations, and wherein the control logic further comprises:
    means for determining whether there are further prefetch operations to queue to prefetch all the requested data; and
    means for adding a prefetch operation to the queue after decrementing the counter and determining that there are further prefetch operations to queue.

13. The bridge system of claim 10, wherein the memory device includes a counter for each of multiple requesting agent, wherein the step of queuing the prefetch operations comprises queuing in separate queues the prefetch operations for the read requests for the multiple requesting agents, wherein prefetch operations are capable of simultaneously being queued for different requesting agents.

14. The bridge system of claim 13, wherein the control logic further includes means for time division multiplexing the prefetch operations in different queues for the multiple agents.

15. The bridge system of claim 10, wherein the memory device includes a counter for each of multiple read requests from a single agent, wherein the control logic further comprises means for queuing prefetch operations for different read requests from the single agent.

16. The bridge system of claim 15, wherein the control logic includes means for time division multiplexing the prefetch operations for the multiple-read requests from the single agent.

17. A bridge system for processing read requests from a plurality of agents over a bus, comprising:
    at least one request buffer for each agent in communication with the bridge, wherein the request buffer for an agent buffers transactions originating from that agent;
    at least one counter indicating a number of prefetch operations to perform to prefetch all requested data; and
    transaction control logic in communication with the bus, the buffer, and the counter, wherein the transaction control logic locates a request buffer to queue prefetch operations to prefetch data for the read request, such that the counter is decremented after a queued prefetch operation from the request buffer is executed.

18. The bridge system of claim 17, further including a read return buffer to buffer prefetched data, wherein the bridge returns prefetched data from the read return buffer to the requesting agents in response to receiving a request for the data from the agent.

19. The bridge system of claim 17, further comprising at least one counter for each of the plurality of agents, wherein prefetch operations for different agents are queued in the read request buffers corresponding to the agents, and wherein prefetch operations are capable of being concurrently queued in the read request buffers for multiple agents.

20. A bridge system for processing read requests from a plurality of agents over a bus, comprising:

at least one request buffer for each agent in communication with the bridge, wherein the request buffer for an agent buffers transactions originating from that agent;

at least one counter indicating a number of prefetch operations to perform to prefetch all requested data, wherein data is capable of being prefetched for multiple read requests from a single agent;

at least one counter for each of the multiple read requests from the single agent; and transaction control logic in communication with the bus, the buffer, and the counter, wherein the transaction control logic locates a request buffer to queue prefetch operations to prefetch data for the read request, such that the counter is decremented after a queued prefetch operation from the request buffer is executed.

21. An article of manufacture for use in programming a bridge system to perform initialization operations in response to a read request from an agent device, the article of manufacture comprising computer useable media accessible to the bridge system, wherein the computer usable media includes at least one computer program that is capable of causing the bridge system to perform the steps of:

receiving a read request indicating a start address of requested data and a transaction length of the read request from the agent via the bridge system;

determining an address range including the requested data;

determining a counter in a memory device corresponding to the determined address range; and setting the counter to a number equal to a number of prefetch operations needed to prefetch all the requested data in the address range, wherein the counter is decremented when a prefetch operation is performed.

22. The article of manufacture of claim 21, wherein the step of determining the address range comprises determining tracks that include the requested data, wherein the step of determining the counter comprises determining a counter for each of the determined tracks, and wherein the step of setting the counter comprises setting each counter to the number of prefetch operations needed to prefetch all the requested data from the track corresponding to the counter.

23. An article of manufacture for use in programming a bridge system to prefetch data to return to a read request from a requesting agent, the article of manufacture comprising computer useable media accessible to the bridge system, wherein the computer usable media includes at least one computer program that is capable of causing the bridge system to perform the steps of:

providing a counter indicating a number of prefetch operations to perform to prefetch all requested data;

prefetching data, while the counter is greater than zero, by performing the steps of:
(i) queuing at least one prefetch operation;
(ii) executing a queued prefetch operation;
(iii) receiving the prefetched data; and
(iv) decrementing the counter; and returning the prefetched data to the requesting agent.

24. The article of manufacture of claim 23, wherein the step of queuing at least one prefetch operation comprises queuing a plurality of prefetch operations, further comprising the steps of:

determining whether there are further prefetch operations to queue to prefetch all the requested data; and adding a prefetch operation to the queue after decrementing the counter and determining that there are further prefetch operations to queue.

25. The article of manufacture of claim 23, wherein data is prefetched for multiple read requests from multiple agents, wherein the step of providing a counter comprises providing a counter for each requesting agent, wherein the step of queuing the prefetch operations comprises queuing in separate queues the prefetch operations for the read requests from the multiple requesting agents, wherein prefetch operations are simultaneously queued for different requesting agents.

26. The article of manufacture of claim 25, wherein prefetch operations are executed in different queues by time division multiplexing the prefetch operations in different queues.

27. An article of manufacture for use in programming a bridge system to prefetch data to return to a read request from a requesting agent, the article of manufacture comprising computer useable media accessible to the bridge system, wherein the computer usable media includes at least one computer program that is capable of causing the bridge system to perform the steps of:

providing a counter for each of a plurality of tracks including requested data, wherein each counter indicates a number of prefetch operations to perform to prefetch all the requested data in the track corresponding to the counter;

prefetching data, while the counter is greater than zero, by performing for each counter:
(i) queuing at least one prefetch operation;
(ii) executing a queued prefetch operation;
(iii) receiving the prefetched data; and
(iv) decrementing the counter; and returning the prefetched data to the requesting agent.

28. An article of manufacture for use in programming a bridge system to prefetch data to return to a read request from a requesting agent, the article of manufacture comprising computer useable media accessible to the bridge system, wherein the computer usable media includes at least one computer program that is capable of causing the bridge system to perform the steps of:

providing counters indicating a number of prefetch operations to perform to prefetch all requested data, wherein data is prefetched for multiple read requests from a single agent, and wherein a counter is provided for each of the multiple read requests from the single agent;

prefetching data, while the counter is greater than zero, by performing the steps of:
(i) queuing at least one prefetch operation;
(ii) executing a queued prefetch operation;
(iii) receiving the prefetched data; and
(iv) decrementing the counter; and returning the prefetched data to the requesting agent.

29. The article of manufacture of claim 28, wherein the step of executing the queued prefetch operations comprises time division multiplexing the prefetch operations for the multiple read requests from the single agent.

* * * * *